United States Patent
Yamamoto et al.

(10) Patent No.: US 12,409,953 B2
(45) Date of Patent: Sep. 9, 2025

(54) CONNECTION ASSEMBLY

(71) Applicant: L'Garde, Inc., Tustin, CA (US)

(72) Inventors: Bryan Yamamoto, Tustin, CA (US); Nathaniel Barnes, Irvine, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

(21) Appl. No.: 17/821,623

(22) Filed: Aug. 23, 2022

(65) Prior Publication Data

US 2022/0402632 A1 Dec. 22, 2022

Related U.S. Application Data

(63) Continuation of application No. PCT/US2020/070445, filed on Aug. 21, 2020.

(60) Provisional application No. 62/980,532, filed on Feb. 24, 2020.

(51) Int. Cl.
  *B64G 1/10* (2006.01)
  *B64G 1/22* (2006.01)
  *B64G 1/64* (2006.01)

(52) U.S. Cl.
  CPC ......... *B64G 1/2227* (2023.08); *B64G 1/1081* (2023.08); *B64G 1/6462* (2023.08)

(58) Field of Classification Search
  CPC .. B64G 1/1078; B64G 1/2227; B64G 1/2226; B64G 1/2225; E04H 15/20; B25J 9/142; B25J 15/0023
  See application file for complete search history.

(56) References Cited

U.S. PATENT DOCUMENTS

| | | |
|---|---|---|
| 3,175,619 A | 3/1965 | Reed, Jr. |
| 3,354,458 A | 11/1967 | Rottmayer |
| 3,521,290 A | 7/1970 | Bahiman et al. |
| 3,780,375 A | 12/1973 | Cummings et al. |
| 4,033,225 A | 7/1977 | Kartzmark, Jr. |
| 4,092,453 A | 5/1978 | Jonda |
| 4,171,876 A | 10/1979 | Wood |
| 4,262,867 A | 4/1981 | Piening |
| 4,475,323 A | 10/1984 | Schwartzberg et al. |
| 4,557,083 A | 12/1985 | Zanardo |

(Continued)

FOREIGN PATENT DOCUMENTS

| | | |
|---|---|---|
| CH | 666235 A5 * | 7/1988 |
| CN | 104393421 | 3/2015 |

(Continued)

OTHER PUBLICATIONS

Inelastic Material, Andrew Horwood and Nachiappan Chockalingam in Clinical Biomechanics in Human Locomotion, 2023. (Year: 2023).*

(Continued)

*Primary Examiner* — Joshua J Michener
*Assistant Examiner* — Ryan Andrew Yankey
(74) *Attorney, Agent, or Firm* — Kari L. Barnes

(57) ABSTRACT

Exemplary embodiments provided herein include connection systems in which a gripper is actuated through introduction of a material to an interior cavity. Embodiments may include more than one cavity such that deployment and actuation may be separately controlled. Additional cavities may also be used and/or selection of valves between cavities such that actuation and/or deployment may further be controlled.

20 Claims, 11 Drawing Sheets

(56) References Cited

U.S. PATENT DOCUMENTS

| | | |
|---|---|---|
| 4,587,777 A | 5/1986 | Vasques |
| 4,647,329 A | 3/1987 | Oono |
| 4,745,725 A | 5/1988 | Onoda |
| 4,759,517 A | 7/1988 | Clark |
| 4,820,170 A | 4/1989 | Redmond et al. |
| 4,852,307 A * | 8/1989 | Goudeau ............... E01D 19/106 451/87 |
| 5,042,390 A | 8/1991 | Schotter |
| 5,085,018 A | 2/1992 | Kitamura et al. |
| 5,163,262 A | 11/1992 | Adams |
| 5,184,444 A | 2/1993 | Warden |
| 5,451,975 A | 9/1995 | Miller |
| 5,507,451 A | 4/1996 | Karnish |
| 5,615,847 A | 4/1997 | Bourlett |
| 5,680,145 A | 10/1997 | Thomson et al. |
| 5,979,833 A | 11/1999 | Eller |
| 6,028,570 A | 2/2000 | Gilger et al. |
| 6,260,797 B1 | 7/2001 | Palmer |
| 6,286,410 B1 | 9/2001 | Leibolt |
| 6,508,036 B1 | 1/2003 | Cadogan |
| 6,568,640 B1 * | 5/2003 | Barnett .................. B64G 1/222 244/172.6 |
| 6,640,739 B2 | 11/2003 | Woodall |
| 6,647,668 B1 | 11/2003 | Choee et al. |
| 6,655,637 B1 | 12/2003 | Robinson |
| 6,830,222 B1 | 12/2004 | Nock |
| 6,904,722 B2 | 6/2005 | Brown |
| 7,104,507 B1 | 9/2006 | Knight |
| 7,941,978 B1 | 5/2011 | Pollard |
| 8,056,461 B2 | 11/2011 | Bossert |
| 8,115,149 B1 | 2/2012 | Manole |
| 8,356,774 B1 | 1/2013 | Banik et al. |
| 8,511,298 B2 | 8/2013 | Ven |
| 8,770,522 B1 | 7/2014 | Murphey et al. |
| 9,146,043 B2 | 9/2015 | Pedretti |
| 9,187,191 B1 | 11/2015 | Jensen |
| 9,296,270 B2 | 3/2016 | Parks |
| 9,499,285 B2 | 11/2016 | Garber |
| 9,666,948 B1 | 5/2017 | Rao et al. |
| 9,742,058 B1 | 8/2017 | O'Neil, Jr. |
| 9,755,318 B2 | 9/2017 | Mobrem |
| 9,810,820 B1 | 11/2017 | Starkovich |
| 9,828,772 B2 | 11/2017 | Murphey et al. |
| 10,036,878 B2 | 7/2018 | Greschik |
| 10,347,962 B1 | 7/2019 | Georgakopoulos |
| 10,642,011 B2 | 5/2020 | Greschik et al. |
| 10,651,531 B2 | 5/2020 | Palisoc et al. |
| 11,142,349 B2 | 10/2021 | Barnes |
| 11,316,242 B2 | 4/2022 | Palisoc et al. |
| 11,713,141 B2 | 8/2023 | Barnes |
| 11,870,128 B2 | 1/2024 | Palisoc et al. |
| 11,905,044 B2 | 2/2024 | Barnes et al. |
| 11,973,258 B2 | 4/2024 | Bolisay |
| 12,145,750 B2 * | 11/2024 | Barnes .................. B64G 1/2225 |
| 2002/0112417 A1 | 8/2002 | Brown |
| 2002/0116877 A1 | 8/2002 | Breitbach et al. |
| 2003/0010869 A1 | 1/2003 | Kawaguchi |
| 2003/0010870 A1 | 1/2003 | Chafer |
| 2003/0132543 A1 | 7/2003 | Gardner |
| 2004/0085615 A1 | 5/2004 | Hill |
| 2004/0140402 A1 | 7/2004 | Wehner |
| 2004/0194397 A1 | 10/2004 | Brown |
| 2005/0103939 A1 | 5/2005 | Bischof et al. |
| 2005/0104798 A1 | 5/2005 | Nolan et al. |
| 2005/0126106 A1 | 6/2005 | Murphy |
| 2005/0168393 A1 | 8/2005 | Apostolos |
| 2005/0209835 A1 | 9/2005 | Ih |
| 2007/0008232 A1 | 1/2007 | Weinstein |
| 2007/0145195 A1 | 6/2007 | Thomson |
| 2008/0035798 A1 * | 2/2008 | Kothera ............... B63H 25/382 244/212 |
| 2008/0228332 A1 | 9/2008 | Hindle |
| 2009/0001219 A1 | 1/2009 | Golecki et al. |
| 2009/0002257 A1 * | 1/2009 | de Jong ................ H01Q 1/428 244/158.3 |
| 2009/0114271 A1 | 5/2009 | Stancel |
| 2009/0124743 A1 | 5/2009 | Lee |
| 2009/0294595 A1 * | 12/2009 | Pellegrino ................ B64G 4/00 244/172.4 |
| 2010/0018026 A1 | 1/2010 | Bassily |
| 2011/0023484 A1 | 2/2011 | Lu |
| 2011/0252716 A1 * | 10/2011 | Pedretti ................ E01D 15/122 404/136 |
| 2012/0097799 A1 * | 4/2012 | Stone ....................... B64G 1/52 244/171.7 |
| 2012/0205488 A1 | 8/2012 | Powell |
| 2012/0297717 A1 | 11/2012 | Keller et al. |
| 2012/0313569 A1 | 12/2012 | Curran |
| 2013/0101845 A9 | 4/2013 | Hiel |
| 2013/0114155 A1 | 5/2013 | Eguro |
| 2013/0175401 A1 | 7/2013 | Starke et al. |
| 2013/0207881 A1 | 8/2013 | Fujii et al. |
| 2013/0292518 A1 | 11/2013 | Lagadec |
| 2014/0030455 A1 * | 1/2014 | Ruschulte ............. B25J 9/1075 139/11 |
| 2014/0042275 A1 | 2/2014 | Abrams et al. |
| 2014/0099853 A1 | 4/2014 | Condon |
| 2014/0151485 A1 | 6/2014 | Baudasse et al. |
| 2015/0194733 A1 | 7/2015 | Mobrem |
| 2015/0336685 A1 | 11/2015 | Wan |
| 2016/0046372 A1 | 2/2016 | Barnes et al. |
| 2016/0054097 A1 | 2/2016 | Sylvia |
| 2016/0130020 A1 | 5/2016 | Chambert |
| 2016/0136820 A1 * | 5/2016 | Lessing ................ B25J 15/0023 294/208 |
| 2016/0159475 A1 * | 6/2016 | Schank .................. B64C 27/72 416/31 |
| 2016/0252110 A1 * | 9/2016 | Galloway ................ A61B 17/02 60/327 |
| 2016/0288453 A1 | 10/2016 | Mejia-Ariza |
| 2016/0311558 A1 | 10/2016 | Turse |
| 2016/0361910 A1 | 12/2016 | Franck, III |
| 2017/0058524 A1 | 3/2017 | Fernandez |
| 2017/0310014 A1 | 10/2017 | Liu et al. |
| 2018/0257795 A1 | 9/2018 | Ellinghaus |
| 2019/0036221 A1 | 1/2019 | Muesse |
| 2019/0097300 A1 | 3/2019 | Palisoc |
| 2019/0144141 A1 | 5/2019 | Barnes |
| 2020/0130872 A1 | 4/2020 | Spencer |
| 2021/0159604 A1 | 5/2021 | Palisoc et al. |
| 2022/0181765 A1 | 6/2022 | Barnes et al. |
| 2022/0388694 A1 | 12/2022 | Barnes |
| 2022/0402632 A1 | 12/2022 | Yamamoto et al. |
| 2023/0155545 A1 | 5/2023 | Bolisay et al. |
| 2023/0399847 A1 | 12/2023 | Greschik et al. |
| 2024/0025568 A1 | 1/2024 | Barnes |
| 2024/0088539 A1 | 3/2024 | Palisoc et al. |
| 2024/0109265 A1 | 4/2024 | Palisoc et al. |

FOREIGN PATENT DOCUMENTS

| | | |
|---|---|---|
| CN | 204216229 | 3/2015 |
| CN | 104691784 A * | 6/2015 |
| CN | 106516164 A * | 3/2017 |
| CN | 105480436 | 7/2017 |
| CN | 106976571 | 7/2017 |
| CN | 107150818 | 9/2017 |
| CN | 111806723 | 11/2021 |
| CN | 110371324 | 3/2022 |
| CN | 112389683 | 5/2022 |
| DE | 1456133 | 6/1965 |
| DE | 3437824 | 4/1986 |
| DE | 10147144 | 2/2003 |
| EP | 524888 | 1/1993 |
| FR | 3081842 | 12/2019 |
| GB | 2322236 | 8/1998 |
| JP | 60125003 | 7/1985 |
| JP | 2004221897 | 8/2004 |
| JP | 2014189145 | 10/2014 |
| JP | 2016030486 | 3/2016 |

(56) References Cited

FOREIGN PATENT DOCUMENTS

| | | | |
|---|---|---|---|
| JP | 2018104250 | 7/2018 | |
| WO | WO-2024023971 A1 * | 2/2024 | ........... B64G 1/1081 |

OTHER PUBLICATIONS

Jimenez, "Mechanics of Thin Carbon Fiber Composites With a Silicone Matrix," Thesis (2011) California Institute of Technology, <http://thesis.library.caltech.edu/6271/1/ThesisMain.pdf>.

International Search Report and Written Opinion for PCT/US2021/72477 dated Mar. 25, 2022, 10 pages.

International Search Report and Writen Opinion for PCT/US2022/079841 dated Mar. 10, 2023, 7 pages.

Costanza et al, "Design and Characterization of a Small-Scale Solar Sail Deployed by NiTi Shape Memory Actuators", Jun. 2016, Science Direct, All Pages (2016).

K.Sonoda, "Materials Application for Spaceraft Use in Japan," in IEEE Electrical Insulation Magazine, vol. 8, No. 2, pp. 18-26, Mar.-Apr. 1992, doi: 10.1109/57.127012. (1992).

* cited by examiner

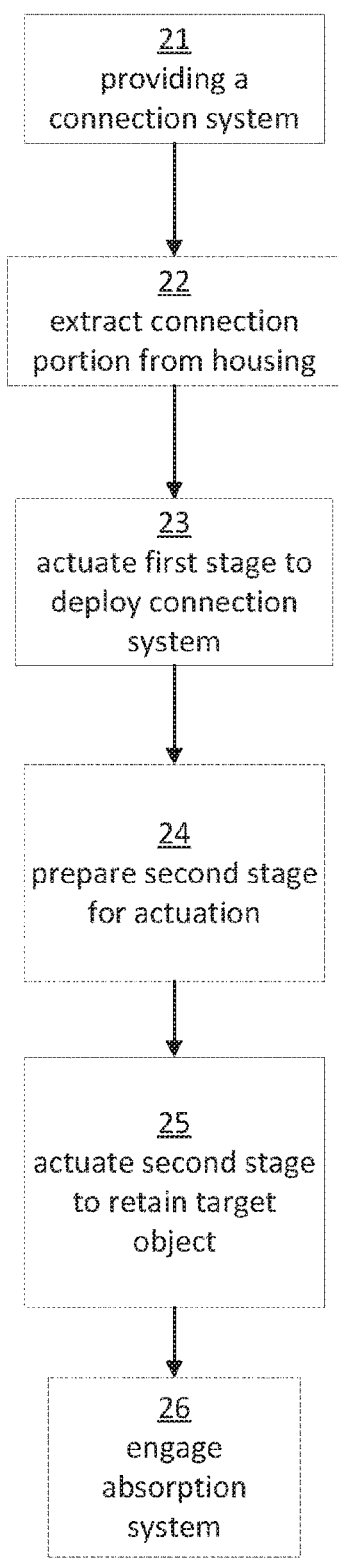
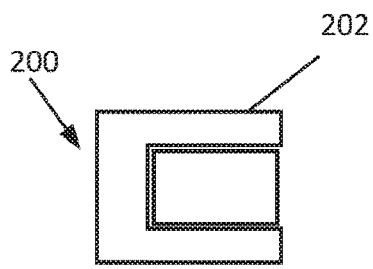
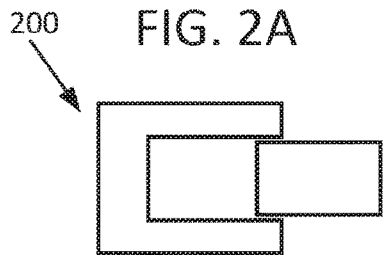
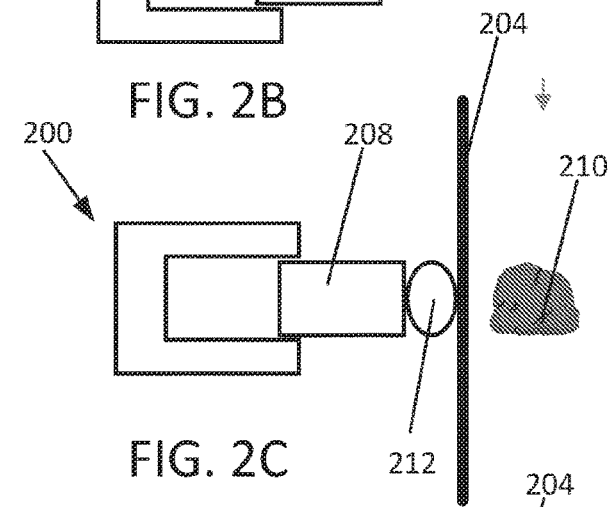
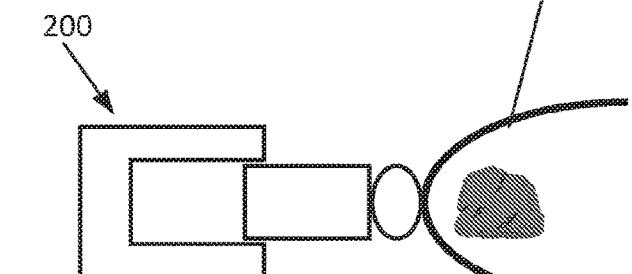
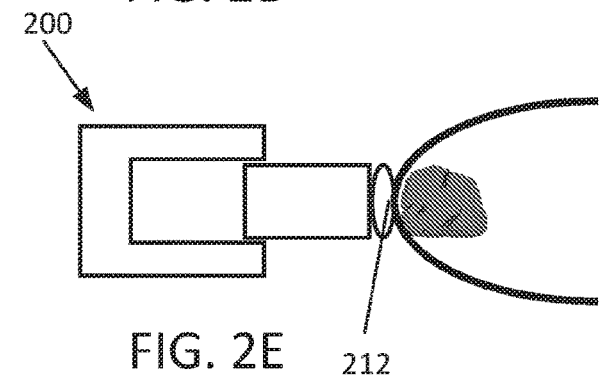

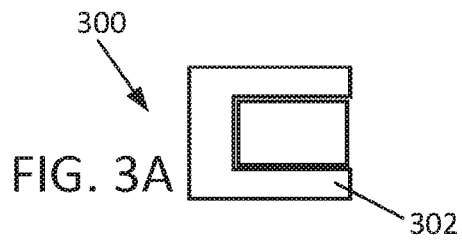
FIG. 3A
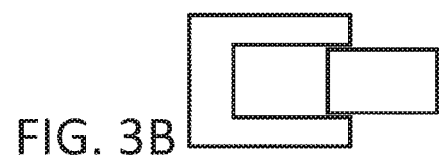
FIG. 3B
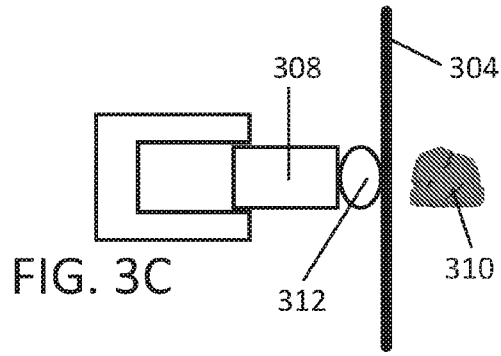
FIG. 3C
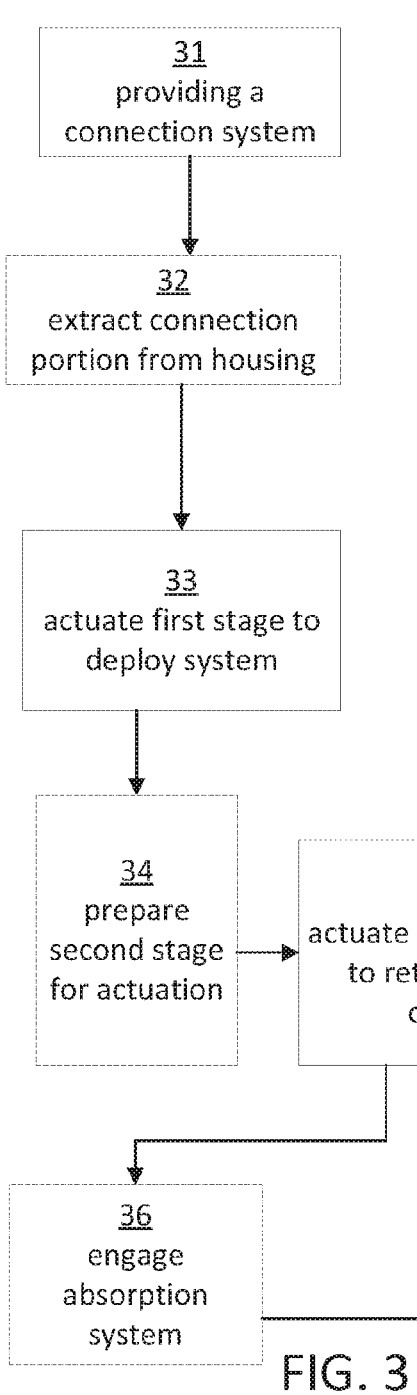
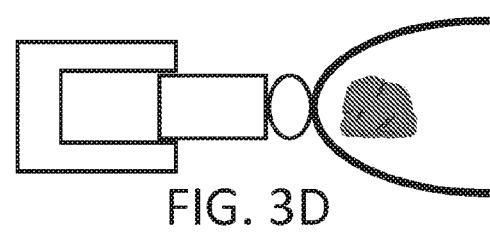
FIG. 3D
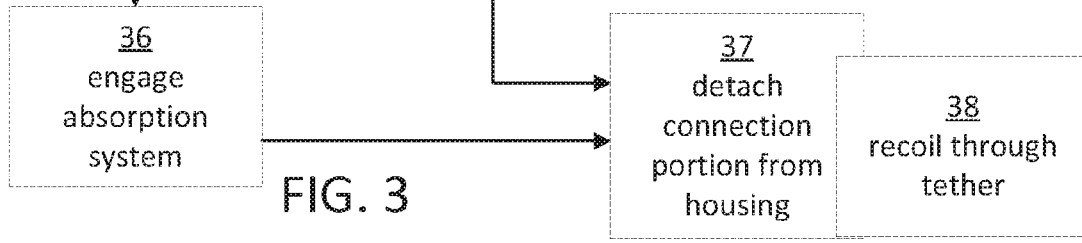
FIG. 3
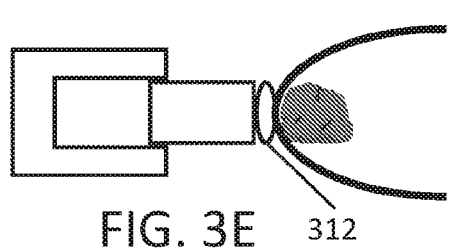
FIG. 3E
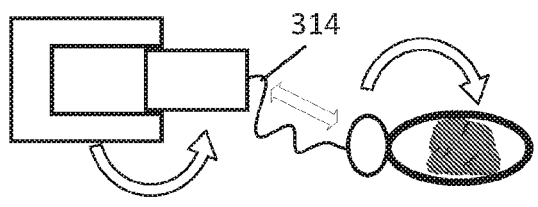
FIG. 3F

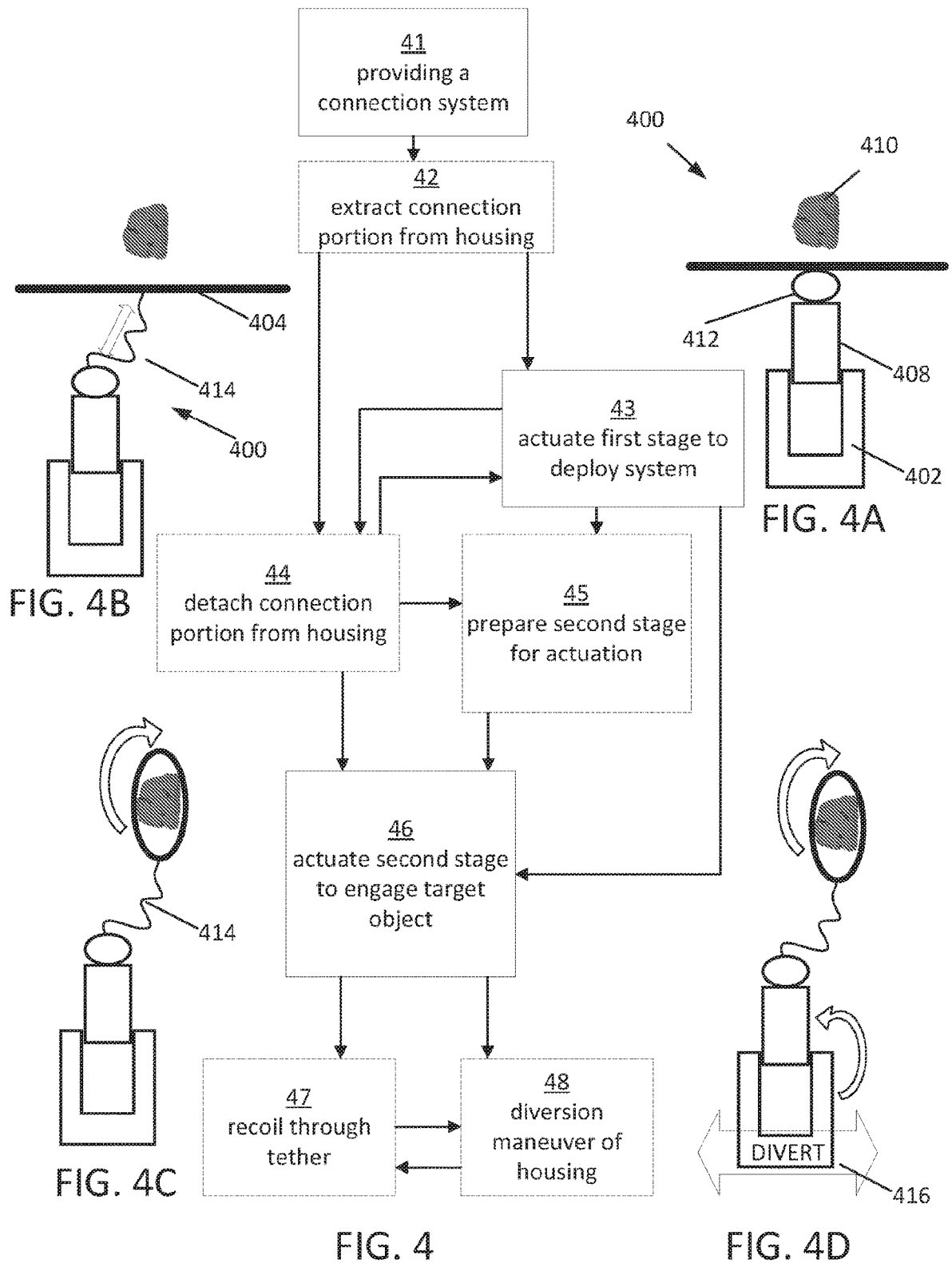

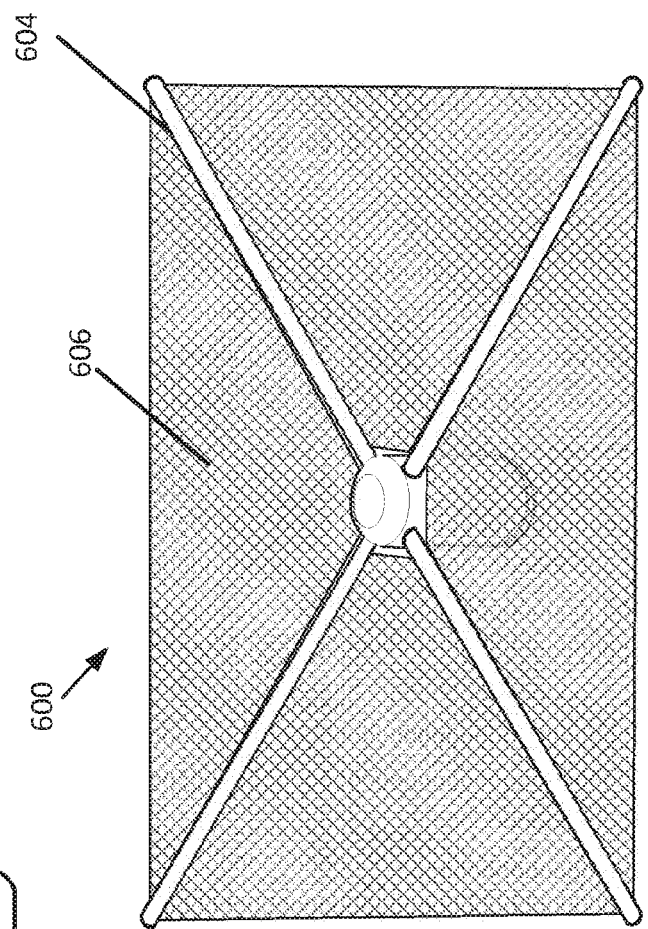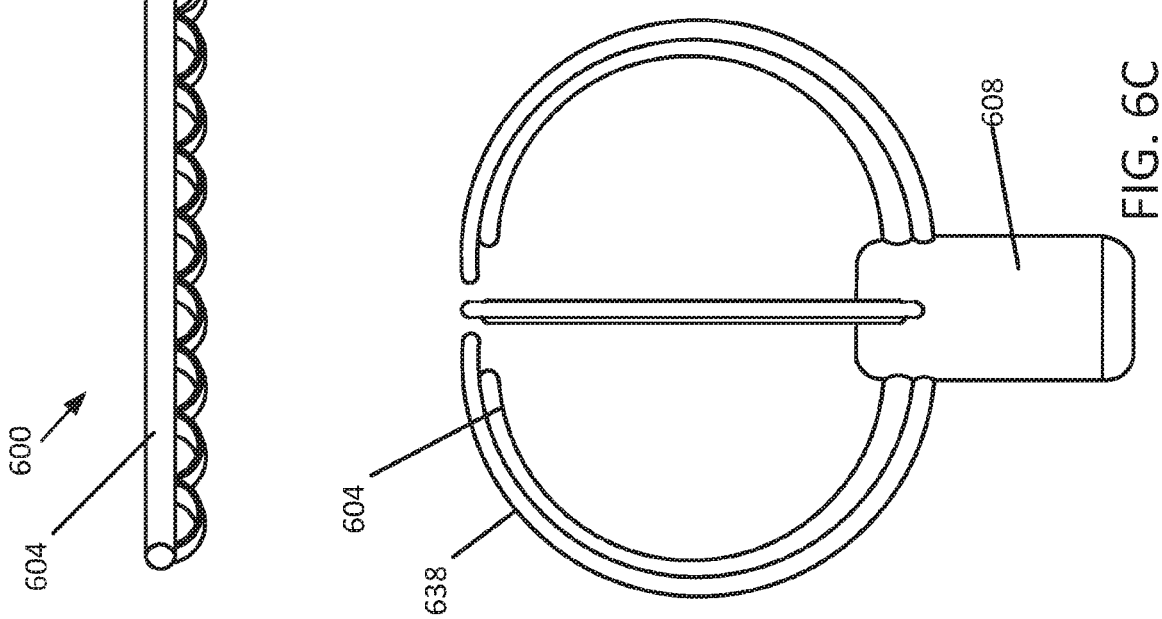

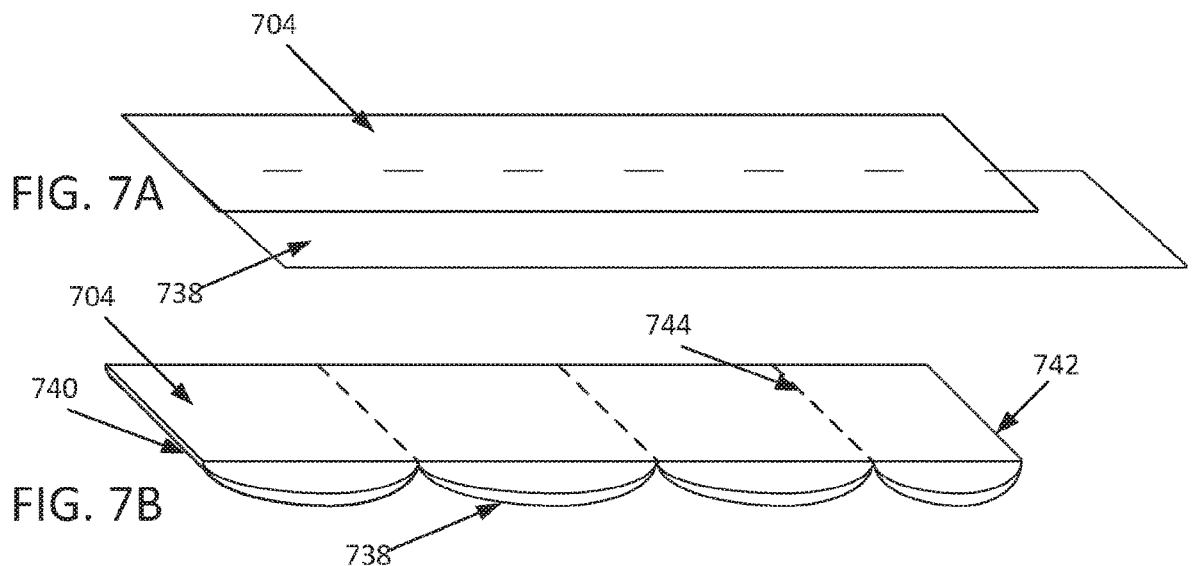
FIG. 7A
FIG. 7B
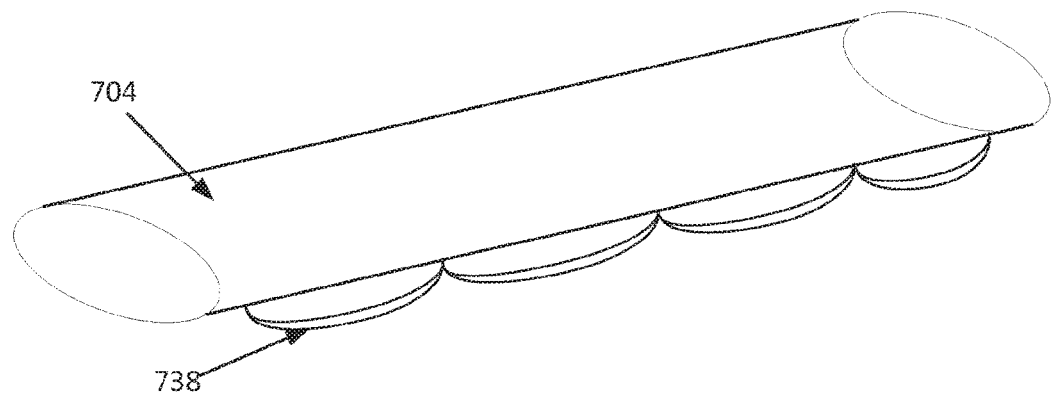
FIG. 7C
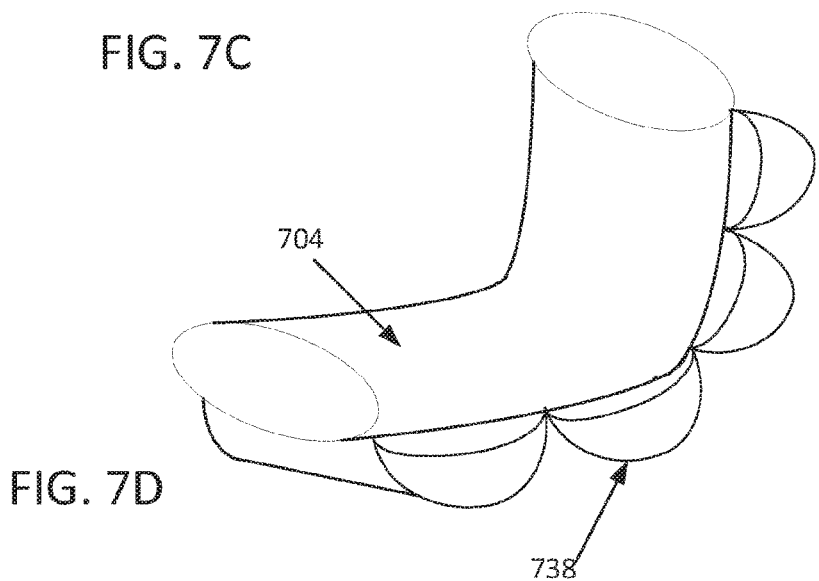
FIG. 7D

CONNECTION ASSEMBLY

PRIORITY

This application claims priority as a continuation of International Patent Application No. PCT/US2020/070445, filed Aug. 21, 2020, which claims priority to U.S. Provisional Application No. 62/980,532, filed Feb. 24, 2020, all of which is incorporated by reference in its entirety into this application.

BACKGROUND

Currently, there are a large number of space debris in Earth's outer atmosphere and in orbit around the Earth. These pose a significant hazard to objects in orbit or passing through on their way to space. There is no solution yet how to feasibly capture this debris and deorbit it.

There may also be other situations in which it is desirable to capture or attach to a target object in space. For example, space mining may be of interest to collect space rocks for new or more abundant minerals or resources. It may be desirable to couple to or attach to a moving space object in an effort to divert or redirect its trajectory.

Conventional Earth solutions for attaching to an object, such as robotic arms are complex. They require power to run actuators and motors. They are also mechanically and electrically complicated. Such electronics, controls, and mechanical parts are difficult to maintain in a space environment. Also, their control usually requires precise manipulation and information about the desired target location. Accordingly, these systems are no desirable in a space environment.

SUMMARY

Exemplary embodiments of a connection portion described herein provide a unique gripper system that permits the orientation or configuration of the gripper separate from the actuation of the extensions between open and closed positions. Such configuration may be used to pack the gripper and permit deployment from a first configuration to a second configuration separate from the actuation of the gripper between an open configuration and a closed configuration.

Exemplary embodiments may achieve the multiple deployment configuration using multiple inflation cavities for actuating and/or creating the multiple configurations. For example, a first inflation cavity may be used to deploy the gripper into a second configuration, such as an open configuration, from a stored configuration. A second inflation cavity may be used to deploy the gripper from the open configuration to a closed configuration. Additional inflation paths and/or inflation cavities may also be used to provide for different actuation of the gripper, such as in segmented actuation and/or in actuation in one or more directions.

DRAWINGS

FIG. 2 illustrates an exemplary flow diagram for deployment of an exemplary connection system according to embodiments described herein. FIGS. 2A-2E illustrate exemplary representative deployment stages corresponding to exemplary steps of FIG. 2.

FIG. 3 illustrates an exemplary flow diagram for deployment of an exemplary connection system according to embodiments described herein. FIGS. 3A-3F illustrate exemplary representative deployment stages corresponding to exemplary steps of FIG. 3.

FIG. 4 illustrates an exemplary flow diagram for deployment of an exemplary connection system according to embodiments described herein. FIGS. 4A-4D illustrate exemplary representative deployment stages corresponding to exemplary steps of FIG. 4.

FIGS. 6A-6C illustrates an exemplary deployment system for use with the connection system according to an exemplary embodiment.

FIGS. 7A-7D illustrate exemplary component parts of a deployment system according to embodiments described herein.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include a connection system that may have multiple deployment states. For example, the connection system may first include a stowed configuration in which the connection system has a reduced dimension. Once the connection system is positioned at a desired location, the connection system may be actuated to deploy to a first deployment configuration. The first deployment configuration may get the connection system ready to engage a target object. For example, the connection system may, have one or more booms that extend from the stored configuration. The first deployment configuration may comprise the one or more booms extending to an extension length. The connection system may be actuated again to a second deployment configuration. The second deployment configuration may be an engagement configuration in which a target object is retained or connected by the connection system. For example, the one or more booms of the connection system may be deformed or otherwise moved from their extended position in the first deployment configuration, and may partially or fully enclose, encircle, or otherwise capture the target object. In an exemplary embodiment, the connection system may include a net, mesh, membrane, or other surface coupled to the one or more booms. The capture surface may be configured to fully or partially enclose, encircle, circumscribe, or otherwise retain the target object. The capture surface may be positioned about the target object by the deformation of the booms to the second deployment condition.

Although embodiments of the invention may be described and illustrated herein in terms of a connection system, it should be understood that embodiments of this invention are not so limited, but are additionally applicable to other applications of a deformable structure. For example, the connection system described herein may include netting or other material such that it acts as a bag or covering to another object. The bag or covering may create a shielding or protection for the other object. The connection system may also be configured to retain another object therein. Exemplary embodiments described herein may also be used as deployment systems, retention systems, actuation systems, trigger systems, and any combination thereof.

Figure 1A:
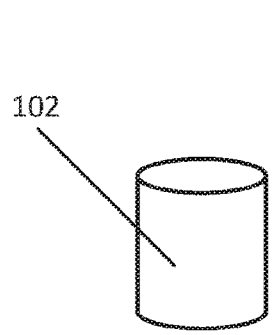
FIGS. 1A-1C illustrates and exemplary deployable connection system in various stages of deployment.
Figure 1B:
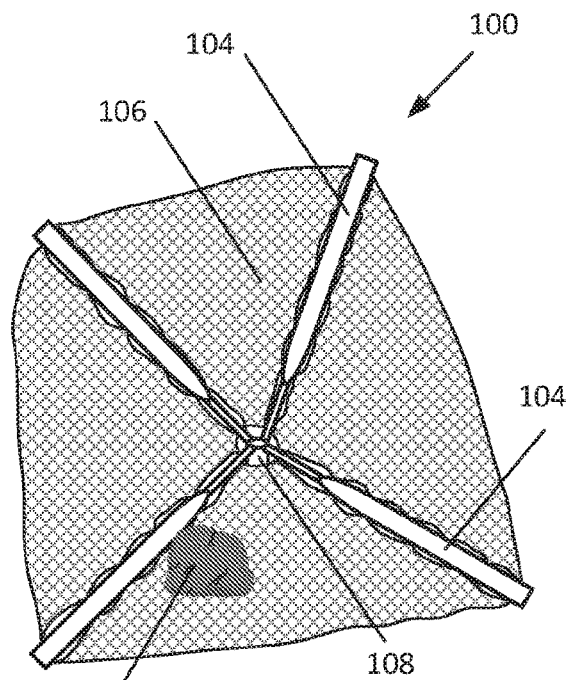
Figure 1C:
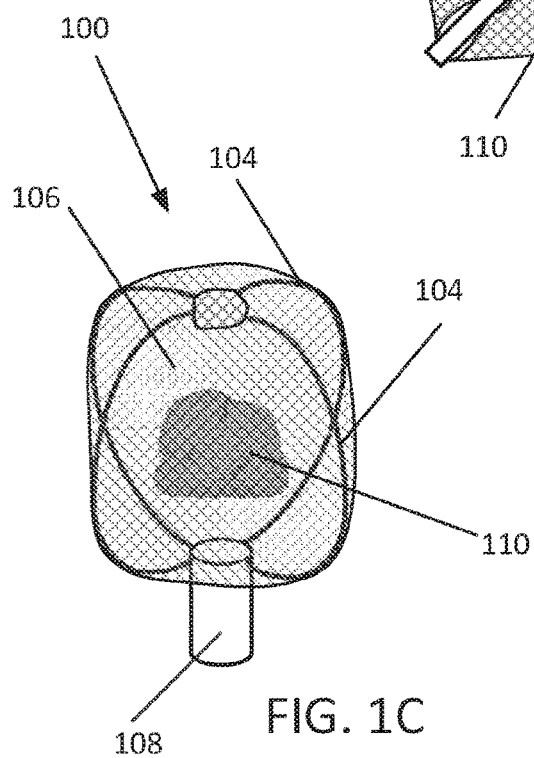

FIGS. 1A-1C illustrates and exemplary deployable connection system in various stages of deployment according to embodiments described herein. The exemplary connection system 100 may include any combination of features as described herein. For example, different boom configurations, actuation methods and systems, deployment methods and systems, retention methods and systems, and any combination thereof described herein may be used.

As illustrated in FIG. 1A, the exemplary connection system 100 may have a stowed configuration. The stowed configuration may be defined by a reduced dimension. The connection system may have a reduced volume, length, width, area, other dimension, or any combination of dimensions. The stowed configuration is desirable in a shape for storage on a spacecraft, rocket, or other vehicle for reaching the Earth's upper atmosphere or space.

As illustrated, the exemplary connection system 100 may include a housing 102 or chassis. The housing 102 may be configured to define the stowed dimension(s) and define a desired shape, size, orientation, and/or profile to fit a desired compartment within a launch vehicle. The housing may fully or partially enclose the remaining components of the connection system. In an exemplary embodiment, the housing 102 may fully enclose the remaining components of the connection system. The housing 102 may permit the connection system 100 to be stored for a desired for a period of time and then used as desired for specific connection objectives. The connection system may therefore comprise an off the shelf solution for connecting to a target object. The connection system, through the housing or through other components may include a connection to a host device. The host device may be any other object in which the connection system may be used to couple a target object to the host device. A host device may include other devices and/or components, such as solar sail for deorbiting or changing an orbit of the target object once connected. Other objects may include other propulsion systems or deorbit systems. The host device may also include shuttles, rockets, satellites, voyagers or other exploratory spacecraft, etc.

As illustrated in FIG. 113, the exemplary connection system 100 may have a first deployment configuration. The first deployment configuration may include a maximum dimension. The first deployment configuration is configured to ready the system to engage a target object. The connection system may therefore include a maximum dimension, such as a length, width, area, or other dimension or combination of dimensions. In an exemplary embodiment, the connection system may include a maximum dimension in which to create a larger profile or capture surface. Creating a maximum dimension may improve the likelihood of capturing the target object and/or may reduce the maneuverability requirements and associated componentry to obtain the target object.

As illustrated, the exemplary connection system 100 may include one or more booms 104, a capture surface 106, and a hub 108. The hub 108 may be part of the housing 102, or may be separate therefrom. The housing 102 may open and permit the booms 104 and capture surface 106 to exit the housing. The housing 102 may fully separate from the remaining components or may stay coupled thereto. The huh 108 may include the system components to actuate one or more portions of the system, may include electronics, controllers, communication interfaces, connectors, or any combination thereof.

The connection system 100 may comprise one or more booms 104 that extend from the hub 108. As illustrated, the booms 104 extend radially outward from the hub. Any combination of booms, such as different quantity, different orientations, different configurations, different origin locations, different terminal locations, and combinations thereof may be used. In an exemplary embodiment, the booms extend radially and linearly outward from the hub. The full extension of the one or more booms may create and define the maximum dimension. As illustrated, the maximum dimension is in area, width, and length. The booms may be configured to extend generally planar to create the maximum possible dimension. The booms may also be configured to extend in the same direction, such as toward one side of the hub, such that the booms create a conical or pyramidal frame structure, Although reducing the maximum dimension, the capture volume is increased to assist in the capture and retention of the target object before or during transition from the first deployment configuration to the second deployment configuration.

As illustrated in FIG. 1C, the exemplary connection system 100 may have a second deployment configuration. The second deployment configuration may include a reduced dimension compared to the first deployment configuration, but may be larger than the dimension compared to the stowed configuration. The second deployment configuration is configured to engage a target object. The second deployment configuration may create an interior cavity defined by a space within the one or more booms 104 and/or by the capture surface 106. The interior cavity may fully or partially enclose, encircle, circumscribe, or otherwise retain the target object 110.

As illustrated, the second deployment configuration may be created or defined by a deformation of the one or more booms. The deformation may be any shape different from the extended configuration of the first deployment configuration. As illustrated, the deformed configuration of the one or more booms is created by the one or more booms being bent or curved at locations or along a length of the booms.

In an exemplary embodiment, the connection system 100 is actuated to transition the connection system from the stowed configuration of FIG. 1 to the first deployment configuration of FIG. 2. The connection system 100 may be deployed to the first deployment configuration once it reaches a target location. For example, the connection system may be in a desired orbit, trajectory path, or proximity to the target object. The connection system may be configured to deploy to the first deployment configuration using different mechanisms. The system may include two actuation steps between the stowed configuration and the first deployment configuration and another between the first deployment configuration and the second deployment configuration. The separation of the actuations between different configurations may permit the connection system to be ready to engage at its own deployment timing, while permitting faster deployment to the engagement configuration. For example, for relatively large booms, transition from the stowed configuration to the first deployment configuration may take some time. This may be performed therefore at a desired location or time before actual engagement with a target object.

As illustrated, the connection system may include a capture surface 106. The capture surface may include anything to assist in the connection and/or engagement of the target object. As shown, the capture surface comprises a net or mesh. The capture surface may also include strings, membranes, material, hooks, connection features, weights, or combinations thereof. The capture surface may also include other features. For example, the capture surface may include properties for shielding. In this example, the connection system may be used to enclose an object and the capture surface may be used to shield the object. In an exemplary embodiment, the shielding may prevent the target object from receiving solar energy, or may prevent or reduce transmission of signals. The connection surface may include materials and/or coatings depending on the purpose of the connection system, FIG. 2 illustrates an exemplary flow diagram for deployment of an exemplary connection system according to embodiments described herein. FIGS. 2A-2E illustrate exemplary representative deployment stages corresponding to exemplary steps of FIG. 2.

First, at step 21, a connection system according to embodiments described herein is provided. As illustrated in FIG. 2A, the connection system 200 may be configured in a stowed configuration and retained within a housing 202. The connection system may be stored and/or transported within the housing. In an exemplary embodiment, the housing may be coupled to a rocket and transported into space.

Next, at step 22, the connection portion of the connection system may be extracted from the housing. As illustrated in FIG. 2B, the housing 202 may be opened and a connection portion partially or fully removed from an interior cavity of the housing. The housing may be opened and/or the connection portion may ejected therefrom. The housing may be integral to the connection system such that extraction may be opening or reconfiguring the housing to expose or permit deployment of the connection portion through expansion and/or actuation.

The system may be navigated to a desired location. In an exemplary embodiment the desired location is a position proximate a target object 210. The desired location may also be within a trajectory path of a target object, may be at a desired orbital location or height, or may be at a location relative to a host device. The system may also be deployed and passively wait for a target object to approach, without regard to a specific desired location or target object. The system may perform any one or more steps as described herein at one or more desired locations.

At step 23, the connection system fray be actuated to deploy the connection portion of the connection system and transition the system from the stowed (or extracted) configuration to the first deployment configuration. As illustrated in FIG. 2C, the components are exposed and the one or more booms 204 are extended. The system may be deployed such that it is ready to actuate the connection portion and engage a target object. In getting ready, the connection portion may transition from the stowed configuration with a reduced dimension, such as a cross section, volume, area, etc. to a first deployed configuration with a greater dimension, such as the cross section, volume, area, etc. The deployment may be through the extension of the one or more booms 204. Exemplary embodiments described herein include booms that may be deployed by filling one or more cavities of one or more first component portions. Exemplary embodiments described herein include booms that may be deployed by extending a curved or coiled tape spring. Any exemplary boom may also be used, such as telescoping, inflatable, shape memory, spring, tape spring, etc. In an exemplary embodiment, the hub 208 may include one or more actuators for actuating the system to transition to the first deployment configuration.

At step 24, the second stage may be prepared for actuation. The first stage may be the system and components for deploying the connection system to the first deployment configuration, while the second stage may be the system and components for engaging the target object and transitioning the system to the second deployment configuration. In an exemplary embodiment, the connection system may prepare the second stage for actuation to reduce the time to engage a target object. The preparation of the second stage may depend on the actuation or the components of the second stage. For example, exemplary embodiments described herein include mechanical components to contact and deform the one or more booms. This configuration may be prepared by bringing the mechanical components into contact with and/or close proximity to the one or more booms. Exemplary embodiments described herein include inflatable structures for deforming the one or more booms. The inflatable structures may therefore be prefilled or partially filled. The preparation of the second stage may be optional.

At step 25, the second stage may be actuated to retain the target object. As illustrated in FIG. 2D, the actuation of the second stage may transition the connection system from the first deployment configuration to the second deployment configuration. In an exemplary embodiment, the one or more booms 204 deform to create a cavity within which the target object 210 is fully or partially positioned. The exemplary configurations illustrated in FIGS. 2A-2E are illustrated with only two booms and without a containment surface. As previously described, any configuration of booms and/or containment surfaces (including any retention structures) may be used. The additional booms and containment surface is removed from these illustrations for the sake of clarity. The boom configurations are also exemplary only to illustrate different configurations of the first deployment and second deployment configurations. Such configurations may be defined by the selected booms and/or actuation systems. Accordingly, the illustrations are intended to only be general representations only and not limiting.

At step 26, exemplary embodiments may optionally employ an absorption system to reduce the impact forces imposed on the connection system during the connection process. Depending on the target object and the method chosen to position and capture the target object, there may be substantial energy transfer between the target object and the connection system. Accordingly, the connection system may include a shock absorbing mechanism 212. The shock absorbing mechanism 212 may be configured to dissipate and/or absorb some of the energy transferred from the target object during the connection process.

As seen by a comparison between FIGS. 2D and 2E, the shock absorbing mechanism 212 may deform to receive some of the energy and reduce the shock and imposed forces on the connection system. The shock absorbing mechanism 212 may be a spring. The spring may be an elastic and/or deformable inflatable: portion of the connection system. The spring may be a coil spring. Other shock absorbing mechanisms may also be used, such as an air bag.

FIG. 3 illustrates an exemplary flow diagram for deployment of an exemplary connection system according to embodiments described herein. FIGS. 3A-3F illustrate exemplary representative deployment stages corresponding to exemplary steps of FIG. 3.

Similar to the methods described in FIG. 2, the method of deploying a connection system and coupling to a target object may include, step 31 (illustrated by FIG. 3A), providing a connection system 300; step 32 (illustrated by FIG. 3B), extracting the connection portion of the connection system from the housing 302; step 33 (illustrated by FIG. 3C), actuate the first stage of the connection system to deploy the connection portion. The deployment may be to configure the connection system in a first deployment configuration, where the one or more booms 304 are extended from a hub 308; step 34, prepare the second stage for actuation; and step 35 (illustrated by FIG. 3D), actuating the second stage to retain the target object. The actuation of the second stage may be to configure the connection system in a second deployment configuration and position the target object in a space within a volume created or defined by the one or more booms, and/or connection surface.

FIG. 3 illustrates an exemplary method that may be used when higher impact forces are anticipated or additional energy may need to be absorbed by the system. In this case, the method may include, at step 36, engaging an absorption system. The absorption system 312 may be similar to that described with respect to FIG. 2. For example, it may include a spring, inflatable/deflatable compartment, etc. Exemplary methods may therefore include different options for transferring energy, such as, for example, at step 36 by engaging an absorption system 312 or step 37 is detaching the connection portion from the housing 302, permitting the connection portion, at step 38, to recoil through a tether 314.

At step 35, the connection portion may be actuated in order to capture a target object. The actuation may be in filling the cavity to deform the one or more booms according to embodiments described herein, by actuating a mechanical component to deform a boom, using material properties to deform a boom, using the impact with the target object to transition the boom to a remembered configuration, or otherwise configure the connection system in the second deployment configuration. In an exemplary embodiment, the one or more booms 304 are deformed to capture or retain the target object 310. In an exemplary embodiment, the system may include a net between adjacent one or mora booms 304 or otherwise supported by the infrastructure created by any combination of the systems described herein. The system may also be configured to separate such that portions of the connection system may move relative to other portions of the connection system.

Exemplary embodiments described herein for capturing or retaining certain target objects may undergo substantial forces during connection. For example, the connection system and/or target object may be moving during the connection process. The target object and connection system may therefore collide as part of the connection process.

The system may therefore include a cushion, spring, or other dampening system to dissipate or reduce the impact during such a collision. As illustrated in FIG. 3E, the system may include an absorption system 312 that may include a spring that absorbs part of the impact so that the hub 308, electronics, housing 302, and other component parts are not adversely affected during the connection process. In an exemplary embodiment, the spring has a cavity that is inflated to cushion against impact. The spring may be a separate cavity, separately filled, or deflated, or may be a part of the one or more booms and/or one or more actuation systems described herein. In an exemplary embodiment, the cavity may have a valve such that it acts as an air bag and can partially deflate to absorb part of the impact forces. As seen in FIG. 3E, corresponding to step 36, a first impact configuration may maintain the connection portion with the housing 302, hub 308, and/or controller of the system. The connection portion, including the one or more booms, may be maintained with the housing 302, hub 308, or other portions of the system, through a direct or indirect connection where the relative separation between the parts is controlled or defined. This can include a connection and retention through the spring configuration of the absorption system.

The system may also be configured to separate at different portions and/or steps of the process, such that the impact forces are minimized for portions of the connection system. As illustrated in FI s. 3F, corresponding to steps 37 and 38, the system may deploy and retain a target object 310. During the actuation of the second components to deform the first components and retain the target object, the spring may still compress and absorb part of the impact forces, at step 36. At the same time, or in response to a threshold force, or other triggering event, the system may be configured to separate such that the hub 308, housing 302, electronics, or desired component portions are permitted to separate from the connection portion (such as the portion including the one or more booms and/or connection surface). In this way, the separated components may experience reduced impact forces as they or the connection portion may simply be pushed away, and may move more freely after the impact with the target object. The connection system may include a tether 314 so that the housing, hub, or other separated component parts may be tethered to each other such that ultimate connection between the system components is retained. The detachment may occur earlier or any time during the deployment and/or actuation of the system. For example, as seen in FIG. 4, the connection portion and the housing/hub/other component parts may separate during or at the deployment of the connection portion and the extension of the one or more booms.

FIG. 4 illustrates an exemplary flow diagram for deployment of an exemplary connection system according to embodiments described herein. FIGS. 4A-4D illustrate exemplary representative deployment stages corresponding to exemplary steps of FIG. 4. Similar to the methods described in FIGS. 2 and 3, the method of deploying a connection system and coupling to a target object of FIG. 4 may include, step 41, providing a connection system 400; step 42, extracting the connection portion of the connection system from the housing 402; step 43 (illustrated by FIG. 4A), actuate the first stage of the connection system to deploy the connection portion. The deployment may be to configure the connection system in a first deployment configuration, where the one or more booms 404 are extended from a hub 408; step 45, prepare the second stage for actuation; and step 46 (illustrated by FIG. 4C), actuating the second stage to retain the target object. The actuation of the second stage may be to configure the connection system in a second deployment configuration and position the target object 410 in a space within a volume created or defined by the one or more booms, and/or connection surface.

FIG. 4 illustrates an exemplary method that may be used when higher or maximum impact forces are anticipated or additional energy may need to be absorbed by the system. This method may similarly be used with the absorption system as described in the other methods. However, given the anticipated impact forces, the impact with the housing, hub, electronics or other system components may need to be avoided. In this case, the method may include, at step 44 (illustrated by FIG. 4B), separating or detaching the connection portion including the one or more booms 404 from the housing. 402. The system, at step 47 (illustrated by FIG. 4C), may thereafter incur the impact forces through a recoil in a tether 414, In an exemplary embodiment, the tether 414 may be elastic or other spring material to absorb some of the impact forces.

As seen in FIG. 4D, the method may also include, at step 48, diverting or others rise moving the housing, hub, electronics or other system components. The system may include a propulsion system 416 that permits the housing and/or hub to be moved. This may be desired to move the target object after it has been captured. It may also be desired to move the housing, hub, or other system components out of a collision path with the target object. The diversion maneuver may be performed when the connection portion is first separated to provide a larger distance between from the connection portion. The diversion maneuver may also be performed at any time during the process.

Exemplary embodiments may be used for target objects of different velocities and/or size. The combination of the velocity and size will correspond to momentum the system has, and therefore, the impact forces the connection system will experience. Depending on the system requirements, strength of the connection surface, absorption system used, deflection length of the spring, spring constant, tether length, tether characteristics, etc., the different configurations described herein may be able to handle a wide range of momentums imposed by the various engagement objects. In an exemplary embodiment, the system is configured to permit selection between engagement configurations, such that any of a desired combination of attached, tethered, or separated alternatives are available to a user. Exemplary embodiments may include any combination of the absorption system, spring, tether, separation mechanism, or other features described herein. The system parts may remain tethered or may be fully separated. The housing/hub/electronics/other component parts may be moved away from the connection portion, such as with a propulsion system, such that collision with these other component parts and the connection portion/target object is avoided.

Exemplary embodiments described herein may be used for attaching to an object very quickly. For example, the deployment and/or actuation of the system to the second deployment configuration may occur within 150 milliseconds.

Figure 5:
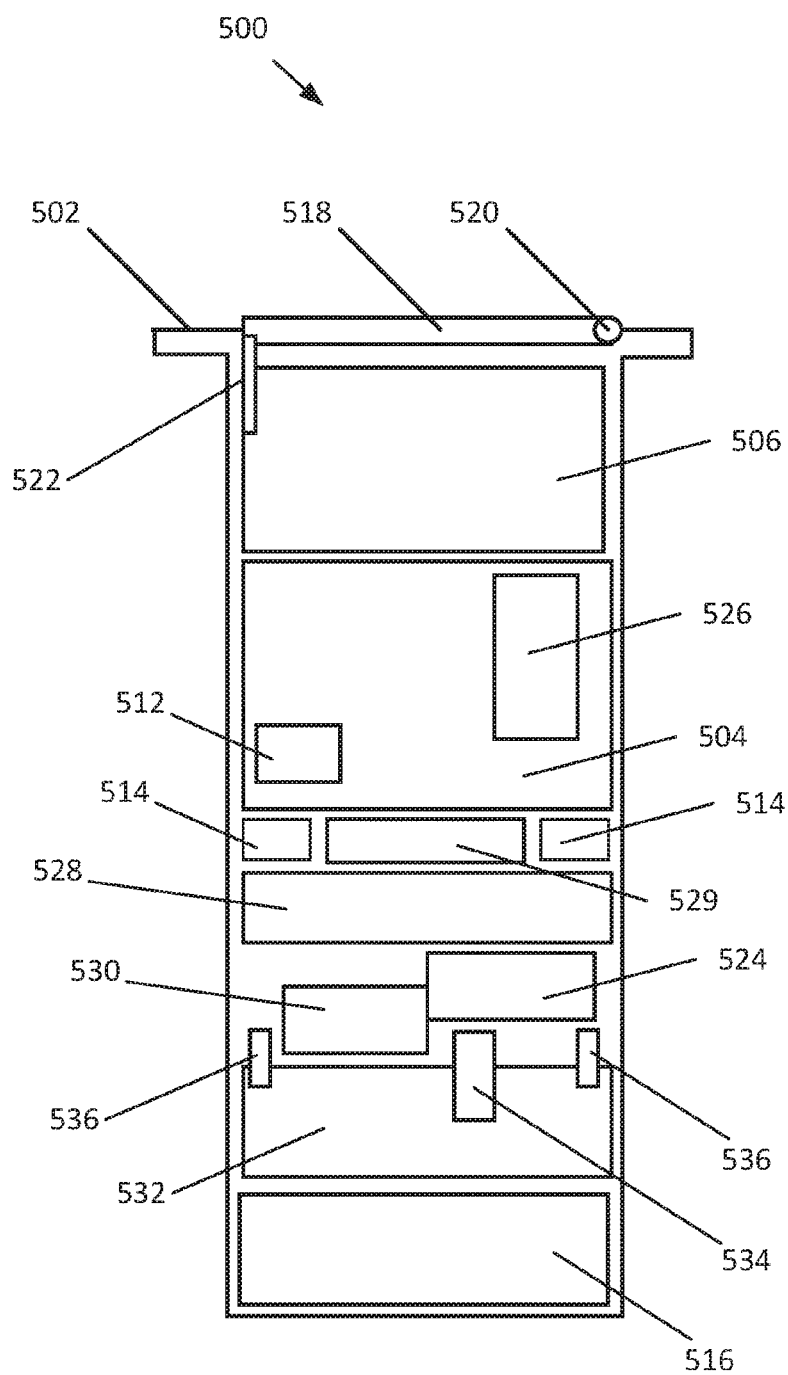
FIG. 5 illustrates an exemplary connection system in a stored configuration.

FIG. 5 illustrates an exemplary connection system according to embodiments described herein in a stowed configuration in which the connection portion is within a housing. As illustrated, the connection system 500 may include a housing 502. The housing may include a cavity for retaining the connection portion and other components of the system. The housing 502 may be opened, separated, or otherwise provide access to the cavity and/or expose the interior of the cavity. As illustrated, the housing 502 includes a door 518 on a door hinge 520 that is controlled by a door release 522. The system may be configured to control the door release 522 that permits the door 518 to open on its hinge 520. The system may also include an extender 528 that moves the system components, including the connection portion out of the housing. The extender may be integrated into the first stage that is used to deploy the connection system to the fust deployment configuration (thereby integrating steps of the exemplary methods described herein).

As illustrated, the system may be configured in a stowed configuration in which the connection surface 506 is stored with the one or more booms 504, and shock absorbing system 512. This portion may also include the second actuator 526 used as the second stage of the exemplary methods described herein to transition the system to the second deployment configuration to retain the target object. The second actuator may be with the connection portion such that the system can deployed in either the separated/ tethered configuration or in the coupled configuration. The top portion of the housing may therefore include the detachable components. The system may include a separator 529 configured to release or detach the detachable components (including the one or more booms, connection surface, shock absorber, and combinations thereof) from the housing, and/or other system components. The system may also therefore include one or more tethers 514 or areas for retaining the tether as described herein.

As illustrated in FIG. 5, the housing 502 may retain a portion of the system components, including electronics, controllers, etc. This portion may act as the hub as described herein. The system may include a first actuator 524 for deploying the system to the first deployment configuration. The first actuator may be positioned with the detachable components and/or may remain with the housing/hub.

The other system components may include a sequencer 530 or other controller for initiating and/or controlling portions of the system. The system may also include connectors 534, interface 532, guide pin 536, and other connections to facilitate control, attachment, retention, interface, or other system requirements. The system may include connection systems for attaching to a host device. The system may include communication systems for sending or receiving instructions through the host device.

The system c ay also include a propulsion system 516 to move the housing for the methods described herein, One or more of the components described herein may be optional.

Exemplary embodiments described herein include an exemplary connection portion including one or more than one interior cavities configured as a boom and one or more than one other interior cavities configured as an actuation mechanism. The interior cavities may be fluidity coupled through one or more valves and/or may be separated and independently coupled to a material source for injecting into the connection system. Exemplary embodiments described herein include a connection system in which the system comprises a plurality of configurations. For example, a first configuration may include a stowed configuration in which each of the more than one interior cavities are evacuated and the connection system has a minimum dimension, such as width, length, diameter, area, and/or volume. The connection system may have a second configuration that may include a first deployment configuration in which the connection system is expanded in a position ready to connect to a target object. The deployed configuration may have one or more booms in an extended position and/or the connection system may have a maximum dimensions, such as a width, length, diameter, area, and/or volume. The first deployment configuration may have one or more of the interior cavities filled with a material. The connection system may have a third configuration that may include a second deployment configuration where the connection system is coupled to a target object. The second deployment configuration may be a deformed configuration in which the connection system is configured to encompass or partially surround another object for coupling thereto. The second deployment configuration may have another of the one or more interior cavities of the actuation mechanism filled with a material.

Although embodiments of the invention may be described and illustrated herein in terms of a connection portion having two portions comprising the one or more booms and the one or more actuation mechanism, both having interior cavities. It should be understood that embodiments of this invention are not so limited, but are additionally applicable to other applications of a deformable structure. For example, the connection system described herein may include other components for the deployable booms, including, for example, shape memory materials, tape spring, or other structure.

FIGS. 6A-6C illustrates an exemplary deployment system for use with the connection system according to an exemplary embodiment. As illustrated, the connection system 600 may include one or more booms 604 that may or may not support or couple to a connection surface 606. The one or more booms 604 are configured to extend from a hub 608 to a first deployed configuration in which the booms are fully extended. The booms are illustrated as linearly extended in a first deployment configuration. Other configurations are also contemplated herein. The booms are also illustrated as being in a plane in the first deployment configuration. The booms may also be configured in other orientations, such as extending in a same direction away from one end of the hub 608 to make a generally conical or pyramidal frame infrastructure. Any first deployment configuration may be used and within the scope of the present disclosure. In an exemplary embodiment, the booms 604 are inflatable, and may be deployed to the first deployment configuration by filling an interior cavity of the boom with an inflation material.

The system may include an actuation mechanism 638 coupled to the one or more booms 604. As illustrated, each boom 604 has an actuation mechanism 638 directly coupled thereto. The actuation mechanism 638 is configured to deform the boom 604 and position the connection system in a second deployment configuration. As illustrated, the actuation mechanism 638 imposes a force along a same side of the boom to deform the boom in a direction away from an end of the hub 608 and toward the central axis of the system. The deformation may therefore curve the booms to define an interior space within the one or more booms.

FIGS. 6A and 6B illustrate the connection system in a first deployment configuration. FIG. 6C illustrates the connection system in a second deployment configuration. The connection surface is illustrated in FIG. 6B as exemplary, but is removed from FIGS. 6A and 6C for ease of illustration and observing component parts.

FIGS. 7A-7D illustrate exemplary component parts of a deployment system according to embodiments described herein.

FIG. 7A illustrates an exemplary section of a connection system for creating an boom and actuation system according to embodiments described herein. An exemplary boom 704 having a cavity. The system may also include an exemplary actuation mechanism 738 having a second cavity. As illustrated, the boom and actuation mechanism are flat and the cavities are evacuated. The material of the boom and actuation mechanism may be flexible in that the material is permitted to move, bend, and deform. The material of the boom and actuation mechanism may be inelastic or elastic. For an inelastic material, the material provides only limited stretch upon application of pressure within the cavity. Inelastic materials are in comparison to other soft gripper systems in which the material had to elastically deform and stretch to create the forces necessary to actuate the grabbing action or deformation of the arm. As illustrated, a boom 704 is shorter than an actuation mechanism 738. The boom 704 may be configured to inflate and deploy or extend by filling the boom 704 with an inflation material. The actuation mechanism 738 may be configured to deform the boom 704 and actuate the arm between an open position to a closed position by inserting a material into the cavity of the actuation mechanism. The boom and actuation mechanism may be inflatable tubes. The tubes may be inflatable with a fluid, such as a gas or liquid.

FIG. 7B illustrates an exemplary attachment between the boom 704 and actuation mechanism 738. The longer component, actuation mechanism 738, may be attached at or proximate its terminal ends 740 and 742 to the shorter component, or boom 704. As illustrated, the boom 704 is coupled to the actuation mechanism 738 such that the first terminal end 740 of each component is coextensive and the second terminal end 742 of each component is also coextensive. In other words, corresponding terminal ends of each component are coupled together. The boom and actuation mechanism may be coupled together on an exterior surface thereof at periodic locations 744 along the length of the components. The attachments may be point attachments or longer, lengthwise attachments. Attachments may be through any method including sewing, gluing, bonding, thermoplastic welding, etc.

FIG. 7C illustrates the deployment of the exemplary extension. The extension described herein includes the boom 704 and actuation mechanism 738. As illustrated, the cavity of the boom 704 may be filled, which extends the boom. The first component may therefore be straight or expand to its predetermine form. By using non-elastic materials, the shape of the boom may be prefabricated and realized through inflation of the component part. As illustrated, the boom 704 is a tube. The cross section of the tube may be any shape, although ovoid is represented for purposes of illustration. FIGS. 6A-6B illustrates an exemplary deployment of a connection portion having a plurality of booms 604 that are inflated to deploy the connection portions and extend away from a hub and a plurality of actuation mechanisms 638 that are uninflated such that the booms are not deformed.

FIG. 7D illustrates the actuation of the exemplary extension. As illustrated, the cavity of the actuation mechanism 738 may be filled, which expands the actuation mechanism. Through the attachment of the actuation mechanism to the boom, the actuation mechanism imposes a force at the attachment points to deform the boom. The attachment locations between the boom and actuation mechanism may be selected to influence the deformation of the boom. For example, the more material length of the actuation mechanism relative to the boom, the more deformation the actuation mechanism will impose on the boom. Therefore, if a hooked claw configuration is desired, the ratio of material length of the actuation mechanism per length between adjacent attachment locations of the boom (component ratio) may be greater toward a terminal end of the extension (combination of the boom and actuation mechanism). The attachment locations, the component ratio, the material selection of either or both of the components, the shape of either or both of the components, the inelasticity of the material of either or both of the components, may be used alone or in any combination to affect the deployment and actuation of the connection system described herein. FIG. 6C illustrates an exemplary actuated connection system in which a plurality of booms 604 are inflated. Each of the plurality of booms 604 has a corresponding one of a plurality of actuation mechanisms 638 that is configured to inflate and deform the corresponding boom attached thereto.

The configuration of the inflatable boom may be deployed in two stages as described herein. The cavities of a plurality of booms may be in fluid communication or may be separated and individually filled. The second stage to inflate the actuation mechanism may be prepared to actuate in exemplary embodiments. In deploying the connection portion to get ready for actuation, the actuation mechanism may be partially filled. A partial fill may correspond to an amount that filled a portion of the cavity of one or more of the plurality of actuation mechanisms. The partial fill may be to an amount that is less than an amount to deflect or deform the boom corresponding to the actuation mechanism.

Figure 8:
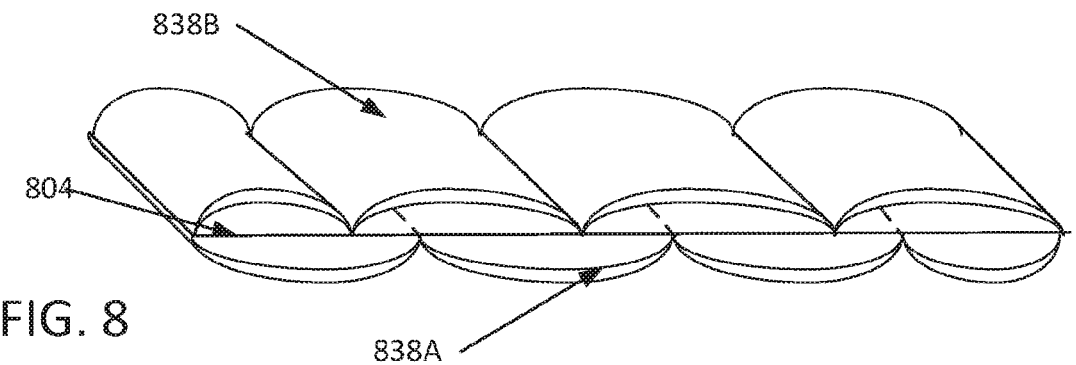
FIGS. 8-10 illustrate exemplary component portions to illustrate concepts of the deployment system according to embodiments described herein.
Figure 9:
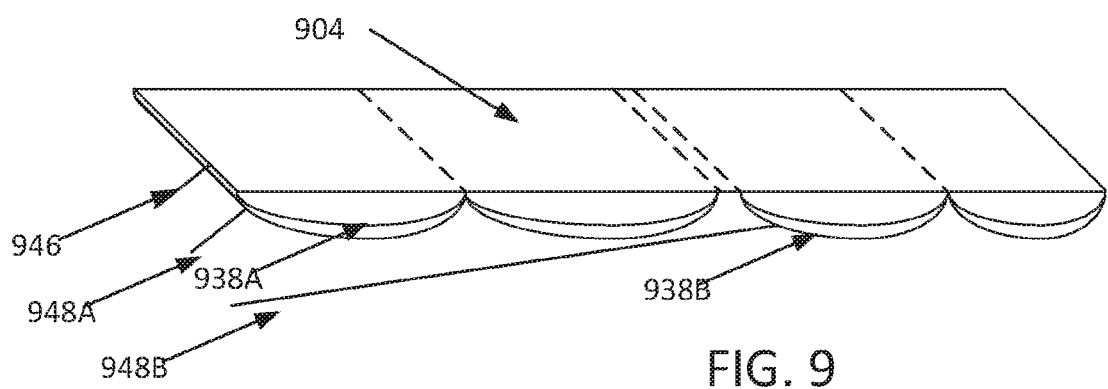
Figure 10:
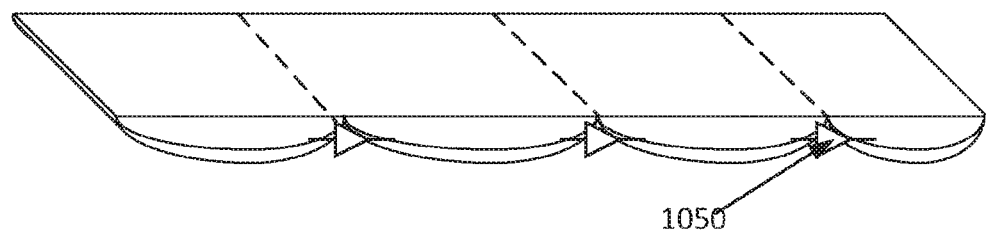

FIGS. 8-10 illustrate exemplary component portions to illustrate concepts of the deployment system according to embodiments described herein. Any combination of components may be used as described herein or would be apparent to a person of skill in the art. The examples provided herein are illustrative only.

As illustrated in FIGS. 8-9, one or more additional components, actuation mechanisms, may be used to deform the one or more booms. FIG. 8 illustrates a second actuation mechanism 838B on an opposing side of the boom 804, opposite a first actuation mechanism 838A. This configuration permits actuation and deformation of the boom in opposing directions. Any combination of additional components may be positioned about a circumference of the boom to permit deformation in different ways, directions, etc, FIG. 9 illustrates a second actuation mechanism 938B in line with the first actuation mechanism 838A, such that different portions of the boom 904 can be selectively deformed. Each of the component parts may have separate material inlets 946, 948A, 948B, such that each cavity of each component part is selectively filled to deploy or actuate the respective component.

FIG. 10 illustrates an exemplary embodiment in which valves 1050 may be positioned within a cavity of one or more component parts creating multiple interior cavities. Valves may also be used between the cavities of different component parts. The valves may be used for the selective filling of one or more portions of the system as desired for deployment, actuation, shaping, or other reason. The valves may have their own controller(s) to open and close the valve as desired. The system may also have one or more other valves, such as to purge or release the material within a cavity.

Figure 11:
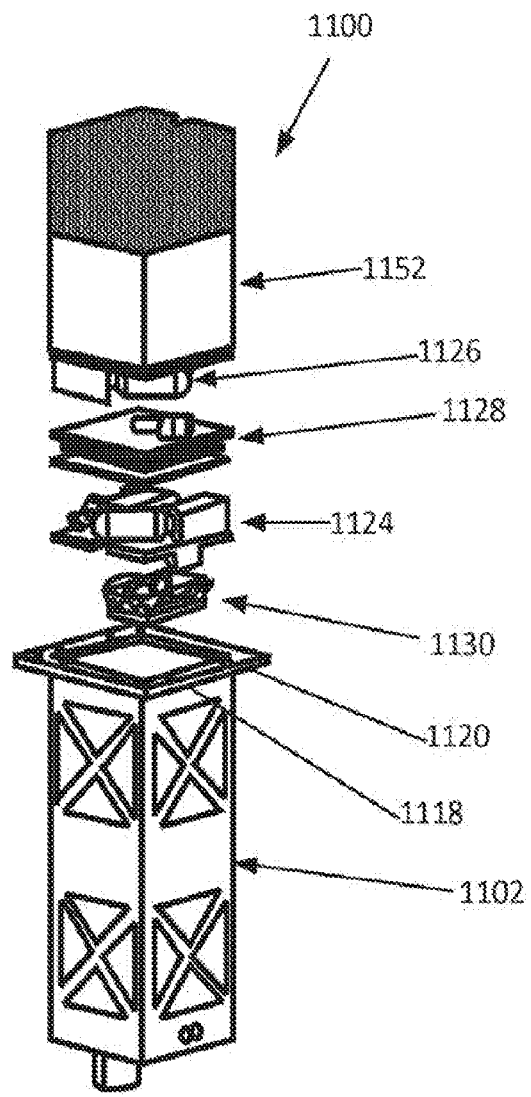
FIG. 11 is an exploded view of an exemplary connection system in a stored configuration according to embodiments described herein.

FIG. 11 is an exploded view of an exemplary connection system in a stored configuration according to embodiments described herein. The connection system 1100 is similar to the representative stowed configuration illustrated in FIG. 5. It may include the detachable components 1152, such as the booms, connection surface, etc. As illustrated, the lower portion of the detachable components may include the second actuator 1126 configured to deploy the actuation mechanism. The actuator may include a gas canister of compressed gas that may be used to fill the one or more actuation mechanisms.

As illustrated, and described with respect to FIG. 5, the system may include an extender 1128. The extender may be used to extract the connection portion from the housing 1102. The extender may be any deployment device. For example, it may be another inflatable configured to push the detachable components 1152 out of the hinged 1120 door 1118. The system may also include electronics 1130. The electronics may be used to control the system, communicate, received or send instructions and/or data, send control signals and/or control components for actuating the first and/or second actuator. The electronics may also include the sequencer to control firings.

The system may include a first actuator 1124. The first actuator 1124 may be used to deploy the extender. The first actuator 1124 may also be used to deploy the booms. In an exemplary embodiment, the booms may be deployed by being inflated while still proximate the housing. The booms may also or alternatively be deployed with the second actuator 1126 to inflate the booms in the configuration of being separated from the housing. The first actuator 1124 may also be positioned with the second actuator 1126 such that both the booms and the actuation mechanisms can be deployed in the detached configuration.

Figure 12:
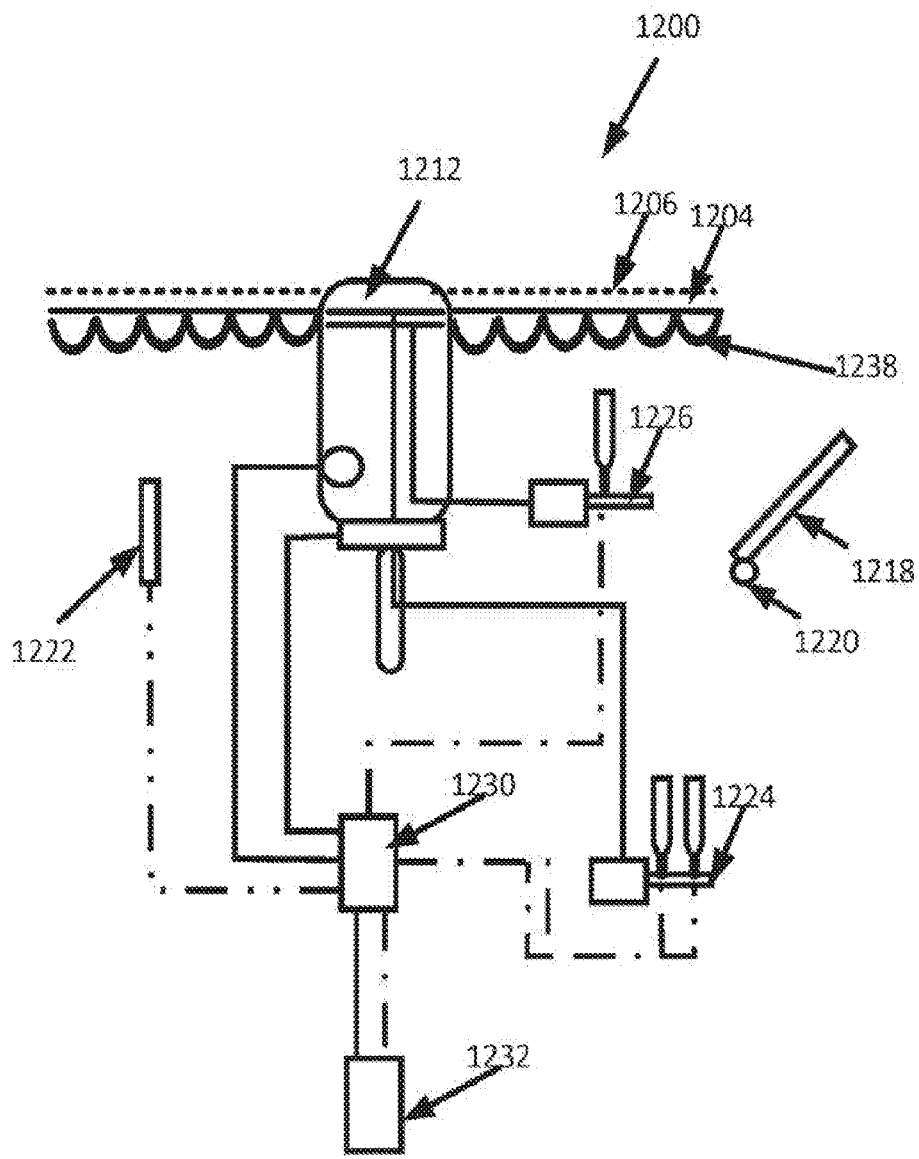
FIG. 12 illustrates an exemplary system configuration of a connection system according to embodiments described herein.

FIG. 12 illustrates an exemplary system configuration of a connection system according to embodiments described herein. The system configuration illustrates the connection system 1200 having more than one boom 1204, with a connection surface 1206 connected thereto. Each of the booms 1204 has a corresponding actuation mechanism 1238 directly coupled thereto. As illustrated, the boom is in the first deployment configuration, and would be inflated, while the actuation mechanisms are ready to be actuated and are in the uninflated or partially inflated configuration. The exemplary fire signals are illustrated in dotted-dashed lines. As illustrated, the system may include a housing (not shown) with a door 1218 that is hinged 1220 and controlled with a door release 1222. A sequencer 1230 or other electronics may be used to control the first actuator 1224 coupled to the boom 1204, and control the second actuator 1226 coupled to the actuation mechanism 1238. The system may also include an interface connector 1232 for communication and/or programming the system. As illustrated, the system may also include a shock absorber 1212. The shock absorber 1212 may be part of the inflation of the booms or may be a separate component for absorbing impact forces. As illustrated, the shock absorber is an inflatable portion that may be configured to burst on impact, deflate upon impact, spring or deform upon impact, or a combination thereof.

Exemplary embodiments of a connection system described herein may be reversibly, deployable. One or more deployment configurations are described herein, which may be actuated in a unidirectional or bi-directional fashion. For example, an exemplary connection may include a stowed configuration in which the connection system has a reduced dimension, volume, surface area, or a combination thereof. The stowed configuration may be one in which the one or more inflation cavities are substantially devoid of inflation material such that the one or more booms may be dynamically deformed. The exemplary connection system may include a first deployed configuration in which the connection system is expanded and ready to connect to a target object. The first deployed configuration may be in which a volume, surface, area, dimension, or a combination thereof of the connection system is larger and/or at a relative maximum. The first deployed configuration may include one or more of the booms extended and a coupled net defining a planar surface or a concave capture surface. The exemplary connection system may be actuated from the first deployed configuration from the stowed configuration by inflating one of the inflation cavities of one or more of the booms. The exemplary connection system may be retracted toward the stowed configuration by deflating the one of the inflation cavities of the one or more booms. The exemplary connection system may also include a captured configuration. The captured configuration may be one which the one or more booms and/or one or more nets covers, couples, encompasses, or otherwise engages all or a portion of a target object. The capture configuration may also or alternative include attachment of the target object through one or more engagement features. In an exemplary embodiment, the connection system may deploy to the captured configuration through inflation of another of the inflation cavities of the one or more booms. The exemplary connection system may then return to the first deployed configuration through deflation of the another of the inflation cavities of the one or more booms. Exemplary embodiments may include actuation between the stowed configuration, the first deployed configuration, to the captured configuration in forward or backward directions in any combination as would be understood by a person of skill in the art. In an exemplary embodiment, the connection system may capture and release a target object, and/or capture and release another target object and/or the same target object. Exemplary embodiments of the connection system may therefore be used to cover, reposition, temporarily connect to or otherwise engage with a target object.

Exemplary embodiments may include engagement features. An engagement feature may be any connection device for securing, coupling, or otherwise attaching the connection system to the target object. For example, an engagement feature may include one or more hooks on the connection system, such as, for example, on the booms, the capture surface, the net, the hub, or other component of the system, or any combination thereof.

Exemplary embodiments of a connection portion described herein provide a unique gripper system that includes two separate inflation paths for extending the gripper and/or actuating the gripper. The two separate inflation paths permit the orientation or configuration of the gripper separate from the actuation of the extensions between open and closed positions, Such configuration may be used to pack the gripper and permit deployment from a first configuration to a second configuration separate from the actuation of the gripper between an open configuration and a closed configuration. Additional inflation paths may also be used to provide for different actuation of the gripper, such as in segmented actuation and/or in actuation in one or more directions.

Exemplary embodiments of a gripper described herein provide a unique gripper in which the material does not need to be expanded in order to actuate or transition the gripper between open and closed positions. Such embodiments may permit larger material selections for different applications. For example, space application or other extreme environments may take advantage of embodiments described herein, not previously available with prior soft gripper systems.

Exemplary embodiments described herein include an connection system having more than one interior cavity. The interior cavities may be fluidity coupled through one or more valves and/or may be separated and independently coupled to a material source for injecting into the connection system. Exemplary embodiments described herein include a connection system in which the system comprises a plurality of configuration. For example, a first configuration may include a stored configuration in which each of the more than one interior cavities are evacuated and the connection system has a minimum dimension, such as width, length, diameter, area, and/or volume. The connection system may have a second configuration that may include a deployed configuration in which the connection system is expanded in a position ready to connect to another object. The deployed configuration may have one or more extensions in an extended position and/or the connection system may have a maximum dimensions, such as a width, length, diameter, area, and/or volume. The deployed configuration may have a first of the more than one interior cavity filled with a material. The connection system may have a third configuration that may include a coupled configuration. The coupled configuration may be a deformed configuration in which the connection system is configured to encompass or partially surround another object for coupling thereto. The coupled configuration may have a second of the more than one interior cavity filled with a material.

Although embodiments of the invention may be described and illustrated herein in terms of a connection system, it should be understood that embodiments of this invention are not so limited, but are additionally applicable to other applications of a deformable structure. For example, the connection system described herein may include netting or other material such that it acts as a bag or covering to another object. The hag or covering may create a shielding or protection for the other object. The connection system may also be configured to retain another object therein. Exemplary embodiments described herein may also be used as deployment systems, retention systems, actuation systems, trigger systems, and any combination thereof.

Figure 13:
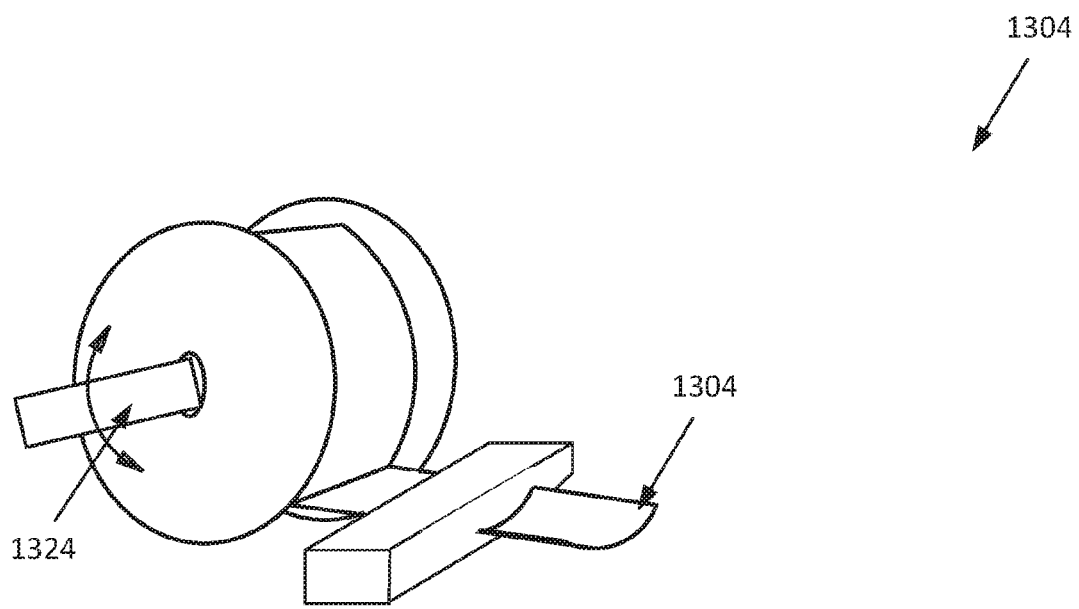
FIG. 13 illustrates an exemplary deployment system of a connection system according to embodiments described herein.
Figure 15:
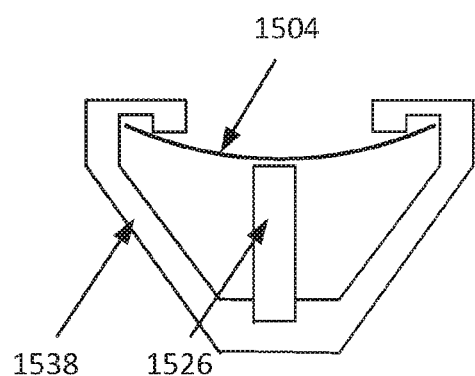

FIG. 13 illustrates an exemplary deployment system of a connection system according to embodiments described herein. The use of tape springs may achieve a similar desired two-stage actuation of a connection system as described herein. The tape spring permits the orientation or configuration of the gripper separate from the actuation of the extensions between open and closed positions. Such configuration may be used to pack the gripper and permit deployment from a first configuration to a second configuration separate from the actuation of the gripper between an open configuration and a closed configuration. For example, a tape spring 1304 may comprise a first stowed configuration. The first stowed configuration may include a low volume or low area configuration for storage within a launch vehicle. As illustrated, the tape spring is wound on a mandrel 1324. The tape spring may then have a second configuration that is an open configuration for the gripper that is separate from the actuation and/or deployment of the gripper. The tape spring 1304 may, extend in an extended position. The tape spring 1304 may then be actuated to close the gripper and enclose the target object. The tape spring may be actuated with an actuator as illustrated in FIG. 15.

Figure 14:
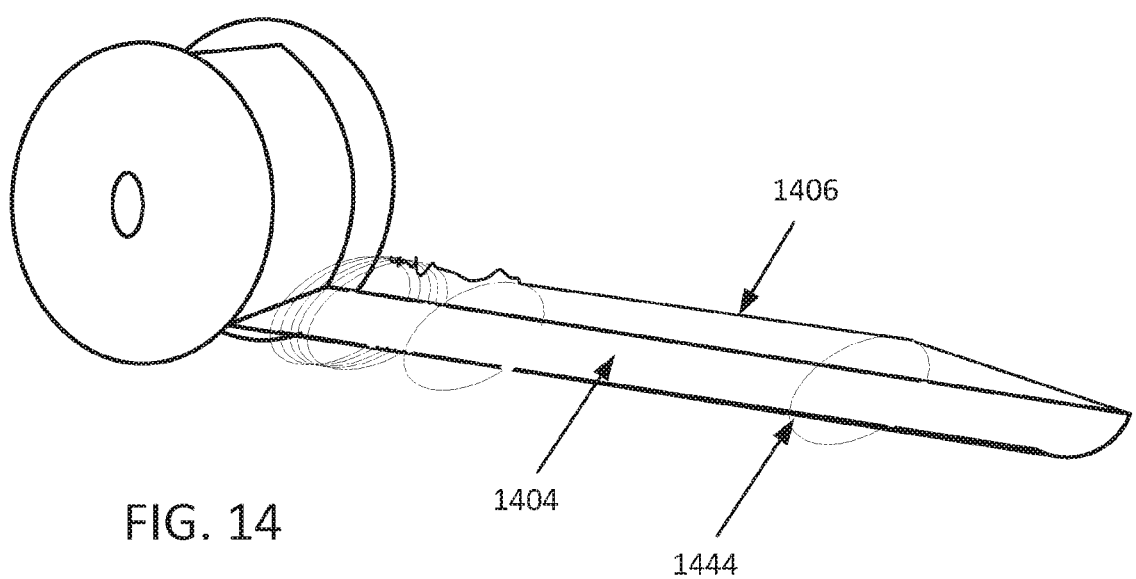
FIGS. 14-15 illustrate exemplary components for an exemplary deployment system according to embodiments described herein.

FIG. 14 illustrate exemplary coupling mechanisms that may be used for the multi-stage deployment gripper according to embodiments described herein. The coupling mechanism may be used in combination with any of the gripper configurations and components described herein. International Application No. PCT/US20/31372, filed May 4, 2020, under common ownership as the instant application, shows and describes a Solar Sail Attachment and Deployment Method. This application is incorporated in its entirety herein by reference. The attachment methods shown and described therein may be used in combination with the embodiments described herein.

The use of the coupling mechanisms described herein allows for multiple deployment and stowage events without failure or degradation of the attached net/membrane. As a result, the innovative attachment mechanism enables a more controlled deployment. The attachment method can be utilized with any existing space structural deployment systems, including: struts, arms, booms (including the shape memory composite deformable boom, telescopic boom, foldable boom, rollable boom), trusses, tape springs, hinged booms or struts (including shape memory carbon composite hinges with stored energy), and inflatable booms, etc. Exemplary embodiments of the structural supports are capable of tolerating the torsional forces resulting from stewing and directing the net/mesh toward a target object.

Exemplary embodiments of the coupling mechanism includes a spatially-periodic attachment of the net/mesh material to the support structure as it is deployed or stowed. The attachment methods may be used to provide an initially collapsed structure that is deployable and/or may permit the re-collapse or storage of a deployed configuration. Other coupling methods are also within the scope of the instant disclosure, including bonding, gluing, sewing, hook and loop fasteners, loops around the boom, and combinations thereof.

As shown and described herein, exemplary embodiments of a gripper attachment includes a spatially-periodic attachment to tether between the support structure and the net/mesh. The attachment may be any combination of attachment features that permit the relative movement between the attachment feature and the support structure to permit the sail to deploy and/or retract. For example, an attachment may include a ring 1444 that circumscribes a portion or an entire circumference of the support structure 1404, The ring may circumscribe a sufficient portion of the support structure to couple the ring to the support structure such that the ring remains positioned around a portion of the support structure. The ring 1444 may permit the longitudinal relative movement of the support structure 1404 such that the ring slides along a length of the support structure. As illustrated with respect to FIG. 15, the ring may define a first side that traverses a side of the support structure and two opposing protections that extend around opposing lateral edges of the support structure.

The ring as used here is not restricted to a circular cross section, but may include any full or partial geometric or non-geometric shape traversing across a generally cross sectional outer surface of the support structure. The ring need not be retained or contained in a single plane but may spiral or otherwise wrap around a portion of the support structure. The ring may be in contact or out of contact with the outer surface of the support structure.

A plurality of rings may be used along a length of the support structure to tether the net/mesh to the support structure at periodic locations along a length of the deployed support structure. Exemplary embodiments described herein may include any combination of mechanisms to position adjacent rings along the length of the support structure at desired intervals. For example, the position and attachment of the attachment feature (e.g. ring) to the sail may define a separation distance between adjacent attachment features in a deployed configuration. For example, the attachment may be a ring that is permanently attached to the net/mesh 1406 or secured to a tether such that the attachment position to the net/mesh does not change. The net/mesh material may then be attached or the attachment feature attached to the support structure at a defined location proximate the end of the support structure. Sequential attachment features may then be positioned along a length of the net/mesh. As the support structure deploys, the net/mesh material is pulled at a terminal end by the extension of the support structure. The attachment feature periodically attached to the net/mesh can then be deployed or pulled along the support structure with the material.

Other positioning devices may also be used as well or alternatively thereto. For example, a tether may be used coupling adjacent attachment features directly together outside of and separate from the support structure and the net/mesh. The support structure may be used in conjunction with the attachment feature to position adjacent attachment features relative to each other. For example, the support structure and attachment feature may include mated features that permit relative motion there between for a length of the support structure, but then engaged at desired location to move the support structure and the attachment feature together. For example, an internal dimension of the attachment feature may correspond to an exterior dimension of the support structure, such that the relationship between the dimensions permit sliding along a length and catches (come in contact to reduce further relative movement in at least one direction) at another length or location of the support structure. For example, an outside dimension of the support structure may be variable: (either continuous or stepwise or a combination thereof) such as from a taper or projection on an outer surface thereof. The inside diameter of the attachment feature may be larger than a portion of variable outside diameter of the support structure for a first length and may be the same or smaller than the variable outside diameter of the support structure for a second length or location. The relative dimension may be created by an indentation, projection, variable outside circumference, and combinations thereof.

In an exemplary embodiment, the system may include an actuator for deploying one or more of the support structures and/or in actuating the gripper from an open configuration to a closed configuration. This can be effected by motors driving or pulling the stowed structure from the stowed configuration to the deployed configuration. The actuator and/or driving or pulling mechanism may depend on the support structure configuration. For example, the support structure may include telescoping booms that are deployed using an internal motor-driver lead screw. For example, the support structure may include rolled tape spring that is deployed through a straightening mandrel. For the tape spring configuration of a support structure, the tape spring may be originally in a wound position. The wound tape spring may be positioned on a mandrel or simply rolled upon itself. The actuator may be configured to extend and deploy the support structure and/or retract and stow the support structure.

FIG. 15 illustrates an exemplary actuation system according to embodiments described herein. In an exemplary embodiment, the system may include an actuator for deploying one or more of the support structures and/or in actuating the gripper from an open configuration to a closed configuration. FIG. 15 illustrates an exemplary actuator 1526 according to embodiments described herein. As illustrated the actuator 1526 may be incorporated into a ring or coupling mechanism 1538 to the tape spring 1504. The ring 1538 may be configured to partially circumscribe more than a majority of the tape spring. The ring therefore encompasses across one side of the tape spring, circles around opposing edges to include portions that extend on the opposite side of the tape spring. The actuator 1526 includes a mechanical mechanism to touch the tape spring to transition the tape spring from the extended position to its remembered curved configuration.

Exemplary embodiments may include a retraction mechanism to assist in net/mesh material retraction or deployment between adjacent support structures. For example, a retraction mechanism may be used to orient and/or position the material between adjacent support structure while the net/mesh is in a retracted position and/or when the net/mesh is being retracted and/or deployed. The retraction mechanism may be used to fold, position; retract, deploy, and combinations thereof, the net/mesh material. An exemplary retraction mechanism may be a tether coupled to the net/mesh material positioned between adjacent support structures. The tether may then deploy and/or retract with the same to position a terminal end of the net/mesh material and/or orient and/or position the interior portion of the net/mesh material relative to the hub. In an exemplary embodiment, the retraction mechanism is coupled proximate the exterior perimeter of the net/mesh between and away from adjacent support structures. The retraction mechanism is configured to retract with the support structures, such that the retraction mechanism pulls and retracts the perimeter edge of the net/mesh material toward the hub. The retraction mechanism may, for example, be a loop that extends around an exterior perimeter of the net/mesh material and back toward the hub on opposing sides of the net/mesh material. The retraction mechanism may, for example, be a tether that extends from the hub to or toward the exterior perimeter of the net/mesh material. The tether may be coupled to the net/mesh material along an entire length or along partial length, such as at discrete and separable positions along the length of the tether. Retraction of the retraction mechanism may therefore pull and position the net/mesh at locations in which the retraction mechanism contacts or attaches to the net/mesh material. The unattached portions of the net/mesh material may therefore be positioned relative to those portions in contact with the net/mesh material. For example, the periodic attachment of the net/mesh material to a tethered retraction mechanism may position the attachment locations adjacent each other, while the unattached portion of the net/mesh is configured to separate from the tether to define or create a pleating of the material for storage. The configuration of the retraction mechanism may reduce or prevent billowing of the net/mesh material as the support structures are retracted and/or the solar net/mesh is stored or restored.

Exemplary embodiments described herein include an connection system having more than one interior cavity. The interior cavities may be fluidity coupled through one or more valves and/or may be separated and independently coupled to a material source for injecting into the connection system. Exemplary embodiments described herein include a connection system in which the system comprises a plurality of configuration. For example, a first configuration may include a stored configuration in which each of the more than one interior cavities are evacuated and the connection system has a minimum dimension, such as width, length, diameter, area, and/or volume. The connection system may have a second configuration that may include a deployed configuration in which the connection system is expanded in a position ready to connect to another object. The deployed configuration may have one or more extensions in an extended position and/or the connection system may have a maximum dimensions, such as a width, length, diameter, area, and/or volume. The deployed configuration may have a first of the more than one interior cavity filled with a material. The connection system may have a third configuration that may include a coupled configuration. The coupled configuration may be a deformed configuration in which the connection system is configured to encompass or partially surround another object for coupling thereto. The coupled configuration may have a second of the more than one interior cavity filled with a material.

Exemplary embodiments described herein includes a connection system. The connection system may include one or more booms, the one or more booms having a stored configuration, a deployed configuration, and a closed configuration. The connection system may also include a capture surface.

In an exemplary embodiment, each of the one or more booms comprises two inflatable cavities. The two inflatable cavities may be separately inflatable. The first of the two inflatable cavities may define a first length, and the second of the two inflatable cavities may define a second length. The second length may be longer than the first length. The length may be measured as the non-attached linear length of the cavity. The two inflatable cavities may be approximately attached adjacent their terminal ends, such that the coupled length of the two inflatable cavities is approximately equal. The lengths are approximate considering the manufacturing tolerances, and the ability to achieve the objective described herein. For example, the lengths may be approximate if the attachment provides the desired curvature upon inflation. In an exemplary embodiment, the attachment is approximately the same length when the lengths are less than 1% different after attachment. In an exemplary embodiment, the terminal end regions of the two inflatable cavities are coupled and the two inflatable cavities are coupled together periodically along the first length.

In an exemplary embodiment, the connection system also includes a hub. The huh may be inflatable. The hub may be inflatable with the inflation of the first or second cavities.

Exemplary embodiments described herein includes a method of capturing a target object. The method may include providing a gripper, deploying the gripper to a first configuration, and deploying the gripper to a second configuration.

Exemplary embodiments may also including providing the gripper in a stored, reduced configuration. The method may include starting the gripper in the stored configuration, then deploying the gripper to the first configuration, and then deploying the gripper to the second configuration at some time after deployment to the first configuration. The method may include deploying the gripper to the second configuration after the gripper is maneuvered proximate a target object. In an exemplary embodiment, the method may include separating the gripper from a housing. The gripper and housing may be retained by a tether. The method may also include enclosing the target object with a capture surface. The target object may be enclosed by inflating a second of the two inflation cavities to the second configuration.

In an exemplary embodiment, the gripper comprises at least two inflation cavities. The method may include deploying the gripper to a first configuration comprises inflating a first of the at least two inflation cavities. The method may include deploying the gripper to a second configuration comprises inflating a second of the at least two inflation cavities.

Although embodiments of the invention may be described and illustrated herein in terms of a connection system, it should be understood that embodiments of this invention are not so limited, but are additionally applicable to other applications of a deformable structure. For example, the connection system described herein may include netting or other material such that it acts as a bag or covering to another object. The bag or covering may create a shielding or protection for the other object. The connection system may also be configured to retain another object therein. Exemplary embodiments described herein may also be used as deployment systems, retention systems, actuation systems, trigger systems, and any combination thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure, Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A connection system, comprising:
   one or more booms, each of the one or more booms comprising a first inelastic material defining a first inflatable cavity and a second inelastic material defining a second inflatable cavity wherein the first inflatable cavity is separately inflatable from the second inflatable cavity;
   a first attachment point on an exterior surface of the first inelastic material defining the first inflatable cavity;
   a third attachment point on the exterior surface of the first inelastic material defining the first inflatable cavity, wherein the third attachment point is separated from the first attachment point by a first material distance along the exterior surface of the first inelastic material;
   a second attachment point on an exterior surface of the second inelastic material defining the second inflatable cavity; and
   a fourth attachment point on the exterior surface of the second inelastic material defining the second inflatable cavity, wherein the fourth attachment point is separated from the second attachment point by a second material distance along the exterior surface of the second inelastic material, wherein the first length is less than the second length,
   wherein the first inelastic material attaches to the second inelastic material at the first attachment point to the second attachment point and the third attachment point to the fourth attachment point,
   wherein the one or more booms are configured to have a stored configuration in which one or more booms are in a retracted orientation, a deployed configuration in which one or more booms are in an extended orientation, and a closed configuration in which the one or more booms are deformed from the extended position by imposing a force on the first and third attachment points to push the first and third attachment points away from each other, and
   wherein the first inelastic material of the first inflatable cavity is coupled to the second inelastic material of the second inflatable cavity at periodic attachment points including at the first attachment point and third attachment point, a ratio of material length between adjacent attachment points on the second inelastic material to the material length between adjacent attachment points on the first inelastic material increases toward a terminal end of the one or more booms so that the boom curves more toward the terminal end in the closed configuration.

2. The connection system of claim 1, wherein the one or more booms achieve the stored configuration, the deployed configuration, and the closed configuration by different inflation combinations in the first inflatable cavity and the second inflatable cavity.

3. The connection system of claim 1, wherein the first inflatable cavity defines a first length, and the second inflatable cavity defines a second length.

4. The connection system of claim 3, wherein the second length is longer than the first length.

5. The connection system of claim 4, wherein terminal end regions of the first inflatable cavity and the second inflatable cavity are coupled and the first inflatable cavity and the second inflatable cavity are coupled together periodically along the first length including at the first attachment point and the third attachment point.

6. The connection system of claim 5, further comprising a hub.

7. The connection system of claim 6, wherein the hub is inflatable.

8. The connection system of claim 7, further comprising a capture surface coupled to the one or more booms, wherein the capture surface comprises a mesh.

9. The connection system of claim 1, wherein the first inflatable cavity and the second inflatable cavity are deflated in the stored configuration, the first inflatable cavity is inflated in the deployed configuration, and the second inflatable cavity is inflated in the closed configuration.

10. The connection system of claim 9, further comprising a capture surface coupled to the one or more booms.

11. A connection system, comprising:
    one or more booms, each of the one or more booms comprising a first inelastic material defining a first inflatable cavity and a second inelastic material defining a second inflatable cavity wherein the first inflatable cavity is separately inflatable from the second inflatable cavity;
    a first attachment point on an exterior surface of the first inelastic material defining the first inflatable cavity;
    a third attachment point on the exterior surface of the first inelastic material defining the first inflatable cavity, wherein the third attachment point is separated from the first attachment point by a first material distance along the exterior surface of the first inelastic material;
    a second attachment point on an exterior surface of the second inelastic material defining the second inflatable cavity; and
    a fourth attachment point on the exterior surface of the second inelastic material defining the second inflatable cavity, wherein the fourth attachment point is separated from the second attachment point by a second material distance along the exterior surface of the second inelastic material, wherein the first length is less than the second length, wherein the first inelastic material attaches to the second inelastic material at the first attachment point to the second attachment point and the third attachment point to the fourth attachment point, wherein the one or more booms are configured to have a stored configuration in which one or more booms are in a retracted orientation, a deployed configuration in which one or more booms are in an extended orientation, and a closed configuration in which the one or more booms are deformed from the extended orientation by imposing a force on the first and third attachment points to push the first and third attachment points away from each other, wherein a first inflatable tube defines the first inflatable cavity and a second inflatable tube defines the second inflatable cavity and the second inflatable tube has a longer length than the first inflatable tube.

12. The connection system of claim 11, wherein the one or more booms achieve the stored configuration, the deployed configuration, and the closed configuration by different inflation combinations in the first inflatable cavity and the second inflatable cavity.

13. The connection system of claim 11, wherein the first inflatable cavity defines a first length, and the second inflatable cavity defines a second length.

14. The connection system of claim 13, wherein the second length is longer than the first length.

15. The connection system of claim 14, wherein terminal end regions of the first inflatable cavity and the second inflatable cavity are coupled and the first inflatable cavity and the second inflatable cavity are coupled together periodically along the first length including at the first attachment point and the third attachment point.

16. The connection system of claim 15, further comprising a hub.

17. The connection system of claim 16, wherein the hub is inflatable.

18. The connection system of claim 17, further comprising a capture surface coupled to the one or more booms, wherein the capture surface comprises a mesh.

19. The connection system of claim 11, wherein the first inflatable cavity and the second inflatable cavity are deflated in the stored configuration, the first inflatable cavity is inflated in the deployed configuration, and the second inflatable cavity is inflated in the closed configuration.

20. The connection system of claim 19, further comprising a capture surface coupled to the one or more booms.

* * * * *